(12) United States Patent  
Matsumoto et al.

(10) Patent No.: US 8,130,598 B2
(45) Date of Patent: Mar. 6, 2012

(54) HEAD FOR THERMAL ASSISTED MAGNETIC RECORDING DEVICE, AND THERMAL ASSISTED MAGNETIC RECORDING DEVICE

(75) Inventors: Takuya Matsumoto, Hachioji (JP); Fumiko Akagi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 1082 days.

(21) Appl. No.: 11/590,785

(22) Filed: Nov. 1, 2006

(65) Prior Publication Data

US 2007/0096854 A1 May 3, 2007

(30) Foreign Application Priority Data

Nov. 1, 2005 (JP) ................................. 2005-318511

(51) Int. Cl.
*G11B 11/00* (2006.01)
(52) U.S. Cl. ................................ 369/13.33; 369/112.27
(58) Field of Classification Search ............... 369/13.01, 369/13.33, 13.32, 13.24, 13.14, 13.03, 112.27, 369/13.13, 112.09; 360/59; 250/201.3, 306; 335/208

See application file for complete search history.

(56) References Cited

U.S. PATENT DOCUMENTS

| 6,333,900 | B1 * | 12/2001 | Maro et al. ................. 369/13.17 |
| 6,649,894 | B2 * | 11/2003 | Matsumoto et al. ........ 250/201.3 |
| 7,133,230 | B2 | 11/2006 | Saga et al. |
| 7,529,158 | B2 * | 5/2009 | Matsumoto et al. ........ 369/13.33 |
| 2004/0081031 | A1 * | 4/2004 | Saga et al. ................. 369/13.33 |
| 2004/0085862 | A1 * | 5/2004 | Matsumoto et al. ........ 369/13.33 |
| 2006/0221482 | A1 * | 10/2006 | Matsumoto et al. ............ 360/59 |

FOREIGN PATENT DOCUMENTS

| JP | 05-101329 | 4/1993 |
| JP | 2004-151046 | 5/2004 |
| JP | 2004-158067 | 6/2004 |

OTHER PUBLICATIONS

Jpn. J. Appl. Phys. vol. 38 (1999) pp. 1839-1840.
Technical Digest of 6th International Conference on Near Fields Optics and Related Techniques, the Netherlands, Aug. 27-31, 2000, pp. 55.

* cited by examiner

*Primary Examiner* — Ali Neyzari
(74) *Attorney, Agent, or Firm* — Antonelli, Terry, Stout & Kraus, LLP.

(57) ABSTRACT

The aim of the present invention is to apply an intense magnetic field to a portion where an optical near-field is generated by a thermal assisted magnetic recording head with a scatterer having conductivity as an optical near-field generating element. To this end, a scatterer for generating an optical near-field is formed in a bottom portion of a slider, and a magnetic field is applied thereto using a coil. In order to increase the intensity of the magnetic field, a magnetic pole made of a soft magnetic material is formed over the scatterer.

17 Claims, 31 Drawing Sheets

FIG. 18 A
FIG. 18 B
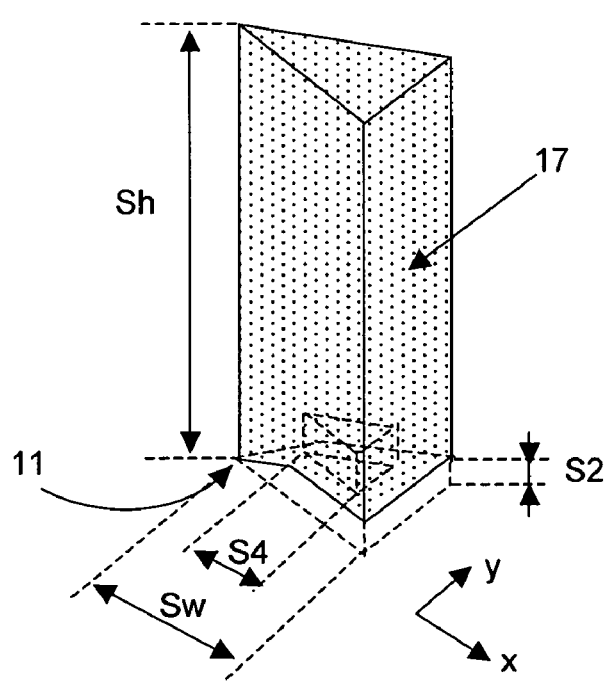
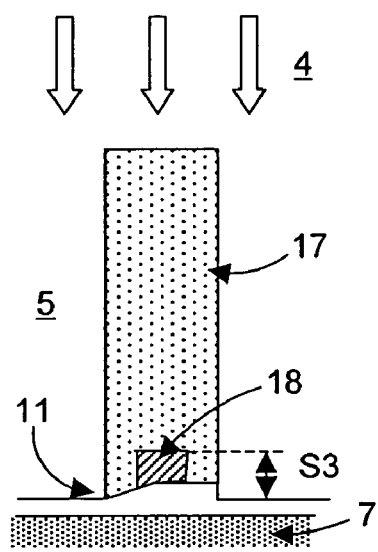

HEAD FOR THERMAL ASSISTED MAGNETIC RECORDING DEVICE, AND THERMAL ASSISTED MAGNETIC RECORDING DEVICE

CLAIM OF PRIORITY

The present application claims priority from Japanese application JP 2005-318511 filed on Nov. 1, 2005, the content of which is hereby incorporated by reference into this application.

BACKGROUND OF THE INVENTION

1. Field of the Invention

The present invention relates to a head for a thermal assisted magnetic recording device, and a thermal assisted magnetic recording device.

2. Description of the Related Art

In recent years, a thermal assisted magnetic recording system has been proposed as a recording system which realizes a recording density of not less than 1 Tb/in² (H. Saga, H. Nemoto, H. Sukeda, and M. Takahashi, Jpn. J. Appl. Phys. 38, Part 1, 1839 (1999)). In conventional magnetic recording devices, when recording density becomes 1 Tb/in² or more, recording information loss due to thermal fluctuations becomes a problem. In order to prevent this, the coercivity of a magnetic recording medium needs to be increased. However, since there are limitations on the intensity of a magnetic field capable of being generated in a recording head, a recorded bit cannot be formed in the medium if the coercivity thereof is increased too much. In order to solve this, in the thermal assisted magnetic recording system, a medium is heated by light at the instant of recording to decrease the coercivity thereof. This enables recording to be performed on a high-coercivity medium, and can realize a recording density of not less than 1 Tb/in².

In such a thermal assisted magnetic recording device, the spot diameter of light applied needs to be a size approximately equal to that of a recorded bit (several tens of nanometers). This is because information recorded in adjacent tracks is erased if the light spot diameter is larger than the above-described size. To heat such a very small region, an optical near-field is used. An optical near-field is an electromagnetic field (light having a wave number with an imaginary part) which locally exists near a very small object having a size of not more than a light wavelength, and is generated using a very small opening having a diameter of not more than the light wavelength, or a metal scatterer. For example, in Technical Digest of 6th International Conference on Near Field Optics and Related Techniques, the Netherlands, Aug. 27-31, 2000, p 55, an optical near-field generator using a metal scatterer having a triangular shape is proposed as a high-efficiency optical near-field generator. When light is made incident on the metal scatterer, a plasmon resonance is excited in the metal scatterer, and a strong optical near-field is generated at a vertex of the triangle. The use of this optical near-field generator makes it possible to efficiently collect light in a region which is not more than several tens of nanometers in dimension.

Japanese Unexamined Patent Publication No. H05-101329 discloses diffusing Zn or the like into the tip of a main pole. However, this is not used as a scatterer.

In the above-described thermal assisted magnetic recording device, to form a recording mark, it is required that a medium be heated using the optical near-field generator and, at the same time, a strong magnetic field be applied to the same position as the heated point.

SUMMARY OF THE INVENTION

An object of the present invention is to provide such a thermal assisted magnetic recording head using a metal scatterer as can apply a strong magnetic field to a point heated by an optical near-field.

In order to achieve the above-described object, in the present invention, a structure is employed in which a magnetic pole is placed over a scatterer having conductivity. "Being placed over a scatterer" means being placed so that the midpoint of the line connecting a point on the scatterer at which an optical near-field is generated and an end portion opposite thereto is arranged to be positioned under the magnetic pole. A width of the magnetic pole is preferably set at a value of not less than Ps and not more than 500 nm, where Ps is a distance between an air bearing surface of a slider and a bottom surface of the magnetic pole. Furthermore, when a direction to the scatterer is a positive direction and an opposite direction to the direction of the scatterer is a negative direction, a position (x1) of an end portion of the magnetic pole with respect to a position of a vertex at which the optical near-field is generated is preferably set so that −100 nm<x1<Ps. Moreover, the distance between the air bearing surface of the slider and the bottom surface of the magnetic pole is preferably set at a value of not less than a skin depth of a material constituting the scatterer and not more than a width of the magnetic pole. The skin depth is a thickness represented by $c/(2\omega k)$, where k is an imaginary part of a refractive index of the material, $\omega$ is an angular frequency of light, and c is the speed of light. It should be noted that in order to increase magnetic field intensity, a material of the scatterer for generating the optical near-field may be a soft magnetic material, which is integrated with the magnetic pole.

A second scatterer may be placed near a vertex of the scatterer at which the optical near-field is generated. In this case, it is preferable that an end portion of the scatterer, which is positioned opposite to the vertex where the optical near-field is generated, be placed to substantially coincide with an end portion of the magnetic pole. If the second scatterer is placed in this way, since the second scatterer has the function of attracting the energy of incident light into the bottom of magnetic pole, it becomes possible to generate a strong optical near-field even in the case where the vertex of the scatterer for generating the optical near-field is positioned under the magnetic pole. It should be noted that the second scatterer may be a shield for reducing background light. The magnetic pole placed over the scatterer may be placed so as to be coupled to a main pole of a single pole transducer used in a magnetic recording device.

According to the present invention, in a thermal assisted magnetic recording head using a conductive scatterer as an optical near-field generating element, a strong magnetic field can be applied to a point at which an optical near-field is generated.

BRIEF DESCRIPTION OF THE DRAWINGS

FIG. 5A is a view showing dependency of the temperature and the magnetic field intensity on the width of the magnetic pole, FIG. 5B is a view showing dependency of the temperature and the magnetic field intensity on the position of the magnetic pole, and FIG. 5C is a view showing dependency of the temperature and the magnetic field intensity on the distance between the slider air bearing surface and the magnetic pole bottom surface.

FIG. 13A is a view showing a magnetic pole having the shape of a triangular prism, and FIG. 13B is a view showing a magnetic pole having the shape of a cylinder.

FIG. 14A is a view showing a trapezoidal scatterer, and FIG. 14B is a view showing a rectangular scatterer.

FIG. 15A is a view showing a case where the shape of the scatterer is a triangle, and FIG. 15B is a view showing the case where the shape of the scatterer is a rectangle.

FIGS. 18A and 18B are views showing an example of a case where the scatterer is made of the soft magnetic material and has a high-conductivity portion inside.

DESCRIPTION OF THE PREFERRED EMBODIMENTS

Hereinafter, embodiments of the present invention will be described with reference to drawings.

Example 1

Figure 1:
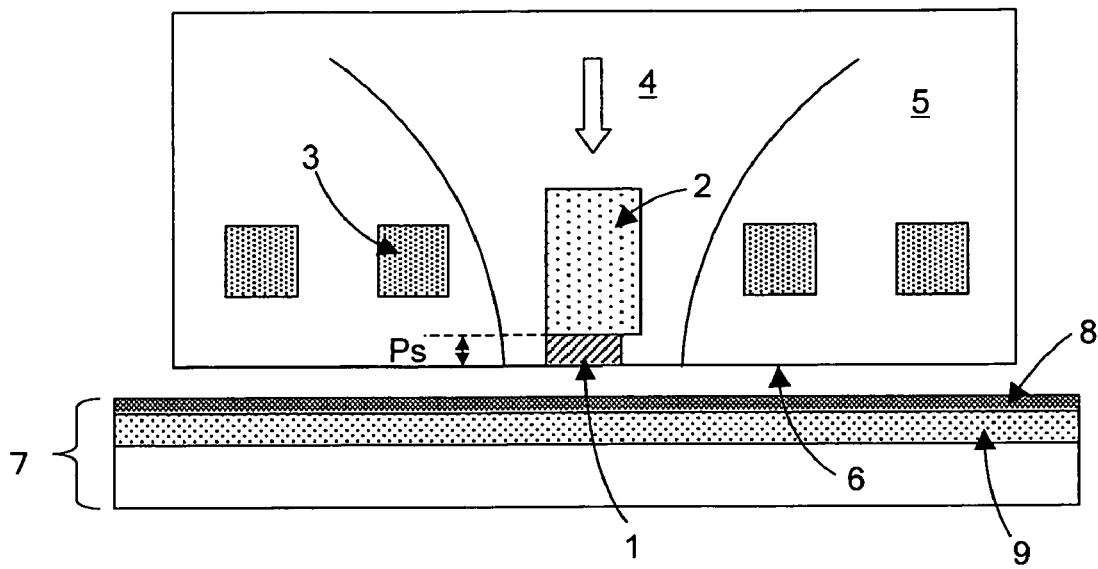
FIG. 1 is a cross-sectional side view showing an example of a thermal assisted magnetic recording head of the present invention.
Figure 2:
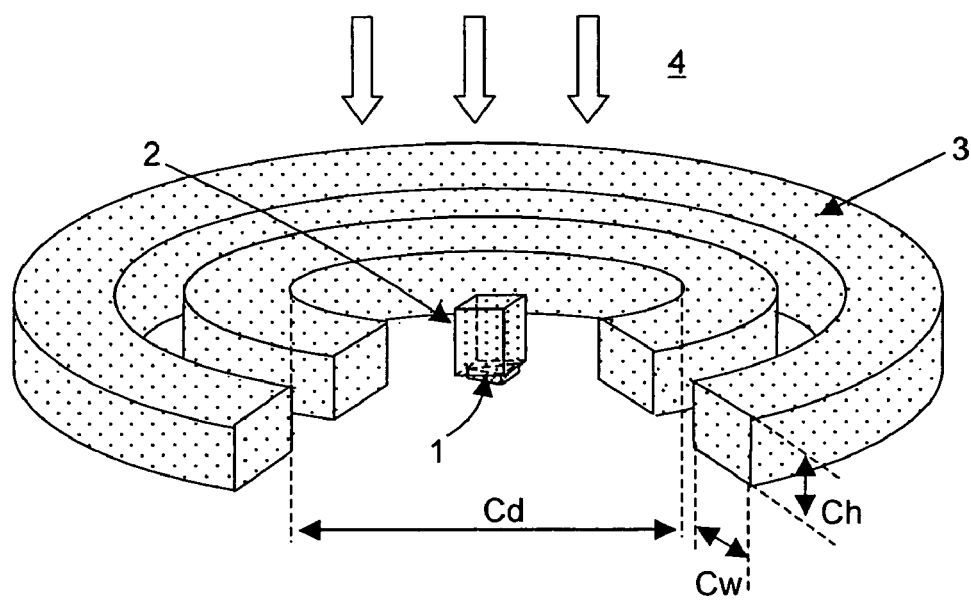
FIG. 2 is a view showing the positional relationship among a coil, a magnetic pole, and a scatterer.

In a head for a thermal assisted magnetic recording device of the present invention, as shown in FIGS. 1 and 2, a conductive scatterer 1 for generating an optical near-field was placed in a bottom portion of a slider 5 to serve as a base of the head, and coils 3 for generating a magnetic field were placed above the scatterer 1 (on the opposite side thereof from a medium 7). Furthermore, in order to increase the intensity of the magnetic field at a position where the optical near-field is generated, a magnetic pole 2 was placed over the scatterer. Here, "being placed over the scatterer" means that the midpoint of the line connecting a point on the scatterer at which the optical near-field is generated and an end portion opposite thereto is arranged to be positioned under the magnetic pole.

The direction in which light enters the scatterer is arbitrary, and it may come from above or below the scatterer 1 or in a lateral or an oblique direction relative to the scatterer 1. It should be noted, however, that in the case of incidence from below, light needs to pass through the medium and much of the light energy is therefore absorbed by the medium. Furthermore, in the case of incidence in a lateral or oblique direction, a lens, a waveguide, or the like for guiding incident light need to be formed obliquely, making it difficult to process them. In consideration of these, it is preferable that the light be made incident from above the scatterer. In this case, incident light 4 passes by the side of the magnetic pole 2 and enters the scatterer 1 by diffraction, and, at the same time, passes through the surface of the magnetic pole 2 and enters the scatterer 1 (the light enters the inside of the magnetic pole to the skin depth thereof).

Figure 3:
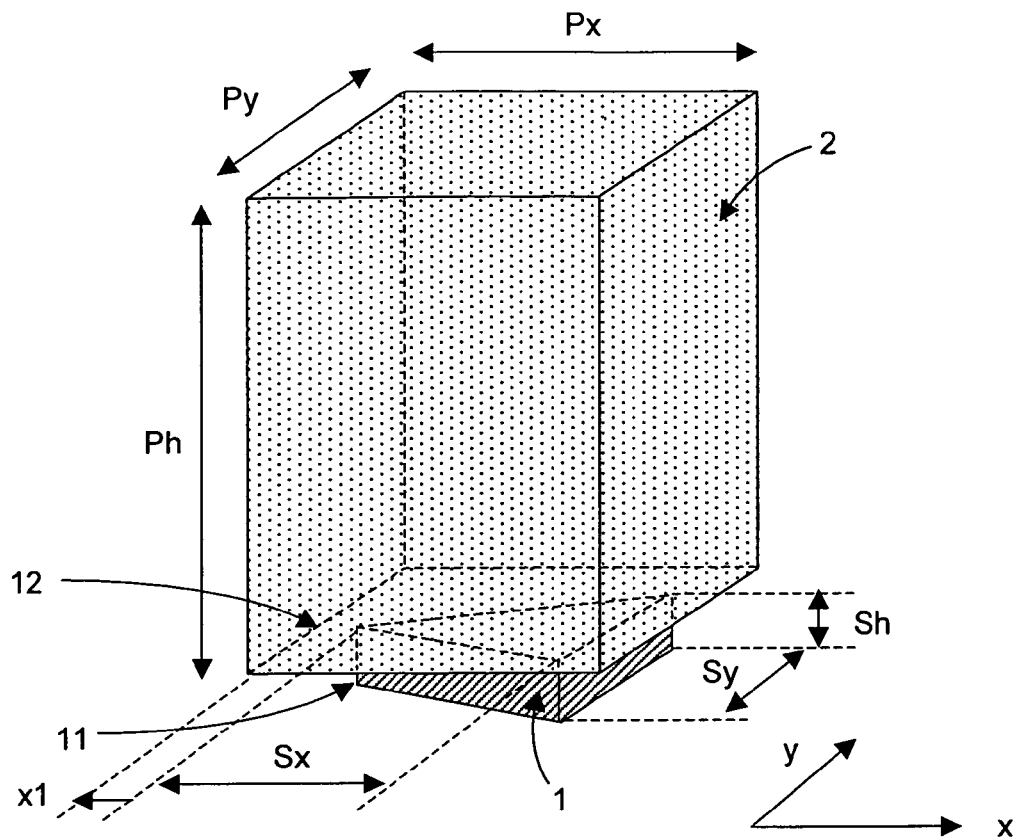
FIG. 3 is a view showing the relationship between the magnetic pole and the scatterer.

In this example, as shown in FIG. 3, the shape of the scatterer 1 was a triangle, and the material thereof was gold. The length Sx thereof was 100 nm, and the thickness Sh thereof was 50 nm. The angle at a vertex 11 at which the optical near-field was generated was set at 60 degrees. The material of the magnetic pole 2 was FeCo alloy, and the shape thereof was a cuboid. The x-direction width Px of the magnetic pole 2 was set at 150 nm, and the y-direction width Py thereof was set at 100 nm. The height Ph of the magnetic pole is preferably made larger than the widths Px and Py of the magnetic pole in order to prevent a decrease in magnetic field intensity due to a demagnetizing field. In this example, the height Ph was set at 500 nm. The scatterer 1 and the magnetic pole 2 were placed in contact with each other. A magnetic field was generated using the circular coils 3 placed around the magnetic pole. The material of the coil was copper. Both of the widths Cw and Ch of a wire of the coil were set at 1 μm, and the inner diameter Cd of the coil was set at 700 nm. The material of the slider 5 was quartz. The material of the above-described scatterer only needs to have conductivity, and may be a metal such as silver, copper, aluminum, iron, or nickel; an alloy thereof; or a semiconductor such as Si. Furthermore, the material of the above-described magnetic pole only needs to be a soft magnetic material, and, for example, may be FeCoNi alloy, FeNi alloy, FeNiMo alloy, FeNiCrCu alloy, FeNiNb alloy, FeCoPd alloy, Fe, FeSi alloy, FeAl alloy, FeSiAl alloy, ferrite compound, or the like.

Figure 4:
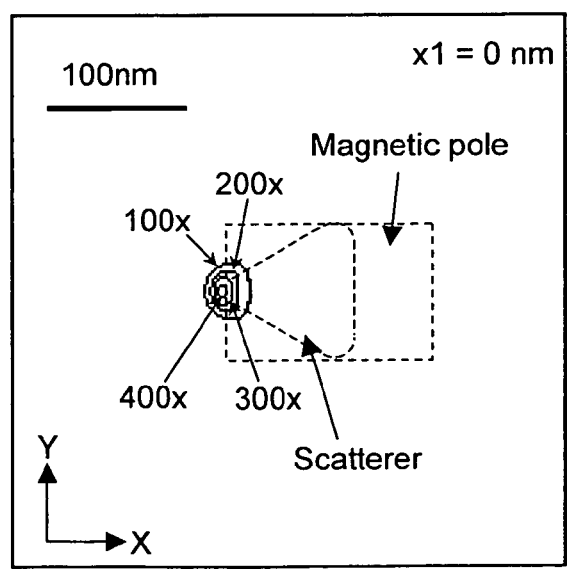
FIG. 4 is a view showing the distribution of optical near-field intensity on a surface of a medium.

FIG. 4 shows the distribution of optical near-field intensity for the case where the position x1 of an end portion of the magnetic pole 2 with respect to the vertex 11 of the scatterer 1 at which the optical near-field is generated is 0 nm in the above-described example. This distribution was calculated using the Finite Difference Time Domain (FDTD) method. In this calculation, the slider 5 was assumed to be placed on a surface of the magnetic medium 7, and the magnetic recording medium 7 was assumed to include a recording layer 8 (material was FePt) having a thickness of 6 nm and a metal layer 9 (material was gold) which was formed under the recording layer 8 and which had a thickness of 30 nm. Here, the metal layer 9 has a role as a heat sink layer for preventing an increase in recording mark size due to thermal diffusion, and, at the same time, also has the function of increasing the optical near-field intensity (an image charge is induced in the metal layer 9 by the charge in the scatterer, and the induced charge and the charge in the scatterer interact with each other, whereby the optical near-field intensity is increased). The distance between the medium surface and a bottom surface 6 of the slider was assumed to be 8 nm. The wavelength of the incident light was set at 780 nm. The incident light was made incident from directly above (in the direction represented by arrows 4). The direction of polarization was set in the x direction of FIG. 3. The optical near-field intensity was represented using the ratio thereof to the incident light intensity, and an observation position was on the medium surface. Even when the magnetic pole 2 is placed over the scatterer 1 as shown in this drawing, a strong optical near-field can be generated. The intensity of the optical near-field generated near the vertex 11 became 400 or more times the incident light intensity. The spot diameter was 15 nm in the x direction and 23 nm in the y direction.

Figure 5:
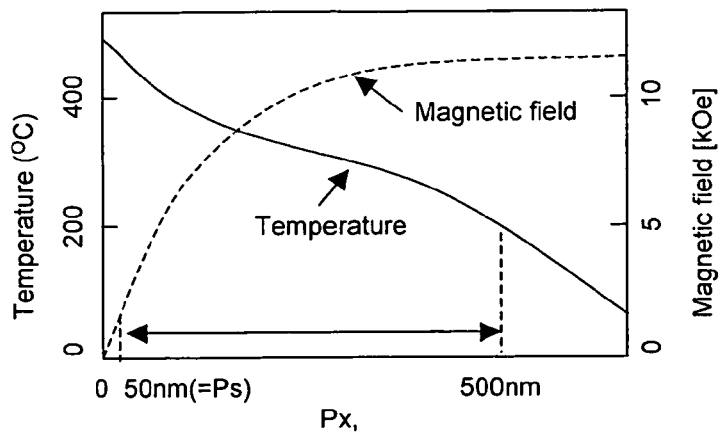
FIGS. 5A to 5C are views showing relationships of a width of the magnetic pole, the magnetic pole-scatterer positional relationship, and a slider air bearing surface-magnetic pole bottom surface distance, to temperature on the surface of the medium and magnetic field intensity.
Figure 5:
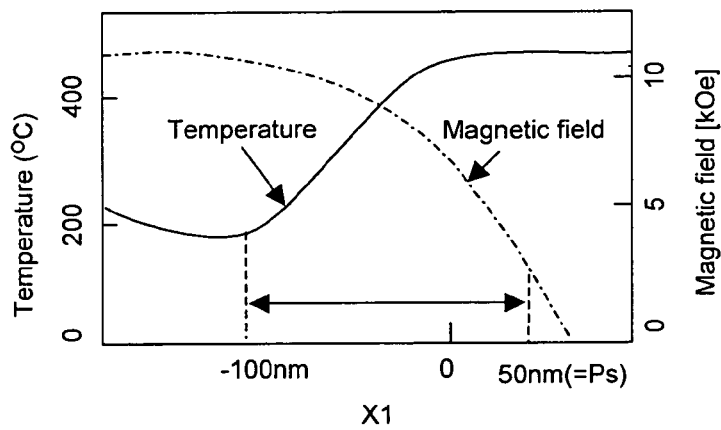
Figure 5:
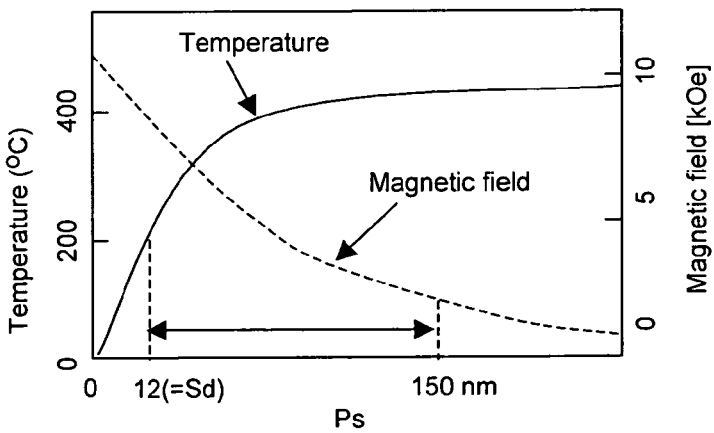

FIG. 5A shows the temperature and the value of the magnetic field intensity which the medium surface took on when the width Px of the magnetic pole 2 was changed (the intensity of the incident light 4 was set at 10 mW, and the spot diameter on the slider surface was set at 700 nm). As the width of the magnetic pole increases, the intensity of the optical near-field generated at the vertex 11 decreases because the light incident on the scatterer 1 is blocked by the magnetic pole 2. As a result, as shown in this graph, the temperature on the medium surface also decreases. In the thermal assisted magnetic recording device, the medium needs to be heated to at least 200° C. or more at the instant of recording. Accordingly, as shown in this graph, the width Px of the magnetic pole needs to be set at 500 nm or less. On the other hand, if the width Px of the magnetic pole is set too small, the magnetic field intensity decreases. In the thermal assisted magnetic recording device, in order to reduce thermal fluctuations, a medium such as a FePt medium is used which has an anisotropy field ($H_k$) of not less than 20 kOe at room temperature. In the case where FePt medium is used, a change in $H_k$ due to heating is approximately 100 Oe/° C., and $H_k$ does not decrease below 2.5 kOe even when it is heated to 200° C. Accordingly, a magnetic field necessary for recording is 2 kOe or more. In consideration of this, the width Px of the magnetic pole needs to be set at 50 nm or more. It should be noted that the distance Ps between the slider air bearing surface and the magnetic pole bottom surface was set at 50 nm here, but, when the distance Ps between the slider air bearing surface and the magnetic pole bottom surface is changed, the minimum of the width of the magnetic pole also changes. The less the value of Ps, the less the minimum of Px. The minimum of the width Px of the magnetic pole is Ps. The above is summarized as follows: the width Px of the magnetic pole is preferably set at a value of not less than the distance Ps between the slider air bearing surface and the magnetic pole bottom surface and not more than 500 nm. It should be noted that the y-direction width Py is also preferably set at a value of not less than the distance Ps between the slider air bearing surface and the magnetic pole bottom surface and not more than 500 nm as in the case of Px.

FIG. 5B shows the temperature and the value of the magnetic field intensity which the medium surface took on when the position x1 of the end portion of the magnetic pole was changed with respect to the vertex 11 of the scatterer at which the optical near-field is generated. In FIG. 3, the position x1 of the end portion 12 of the magnetic pole is positive in the case where the end portion 12 of the magnetic pole is positioned in the inward direction from the vertex 11 at which the optical near-field is generated toward the center of the scatterer (direction toward the center), and negative in the case where the end portion 12 of the magnetic pole is positioned at a side opposite to the center of the scatterer (direction away from the center). As shown in this drawing, when the value of x1 becomes negative (the vertex 11 at which the optical near-field is generated is positioned inside the magnetic pole), the temperature decreases. As described previously, in the thermal assisted magnetic recording device, the medium needs to be heated to 200° C. or more. To achieve this, it is recommended that x1 be set at −100 nm or more. It should be noted, however, that in the case where x1 is positive, the vertex 11 at which the optical near-field is generated is positioned outside the magnetic pole 2. Accordingly, the intensity of the magnetic field applied to the medium decreases. As described previously, a necessary magnetic field is 2 kOe. To meet this, x1 needs to be set at 50 nm or less. It should be noted that the distance Ps between the slider air bearing surface and the magnetic pole bottom surface was set at 50 nm here, but, when the distance Ps between the slider air bearing surface and the magnetic pole bottom surface is changed, the maximum of x1 also changes. The less the value of Ps, the less the maximum of x1. The maximum of x1 is Ps.

The above is summarized as follows: the position x1 of the end portion 12 of the magnetic pole is preferably set at a value of not less than −100 nm and not more than the distance Ps between the slider air bearing surface and the magnetic pole bottom surface. It should be noted that, in thermal assisted magnetic recording, when recording is performed with the positions of a heat source and the magnetic field adjusted so that the maximum of gradient of the temperature distribution (dT/dx, where T is temperature) on a medium surface and the maximum of gradient of the magnetic field distribution thereof (dH/dx, where H is the magnetic field) overlap each other, the S/N ratio of a reproduced signal becomes maximum (F. Akagi et al., Japanese Journal of Applied Physics, Vol. 43, No. 11A, 2004, pp. 7483-7488). Accordingly, x1 is preferably set in the above-described optimum range of x1 so that a position at which the gradient of the temperature distribution (dT/dx) on the medium surface becomes maximum and a position at which the gradient of the magnetic field distribution thereon (dH/dx) becomes maximum overlap each other.

FIG. 5C shows the value of the magnetic field intensity on the medium surface and the value of the temperature on the medium surface when the distance Ps between the slider air bearing surface and the magnetic pole bottom surface is changed. Here, the widths Px and Py of the magnetic pole were set at 100 nm. As shown in this drawing, as the distance Ps between the slider air bearing surface and the magnetic pole bottom surface increases, the magnetic field intensity on the medium surface decreases. As described previously, since a magnetic field of 2 kOe or more is required, in order to meet this, Ps needs to be set at 100 nm or less. It should be noted that the widths Px and Py of the magnetic pole were set at 100 nm here, but, when the widths of the magnetic pole are changed, the maximum of Px also changes. The more the widths of the magnetic pole, the more the maximum of Ps. The maximum of Ps is equal to the widths Px and Py (or, the average of Px and Py in the case where Px and Py differ from each other) of the magnetic pole. On the other hand, if Ps is too small, the thickness Sh of the scatterer becomes too small. Accordingly, the light passes through the scatterer, and the optical near-field intensity decreases. As a result, the temperature on the medium surface also decreases. As described previously, heating temperature needs to be set at 200° C. or more. To achieve this, Ps needs to be set at 12 nm or more. This value corresponds to the skin depth (Sd) of the material constituting the scatterer 1. Here, the skin depth (Sd) is represented as:

$$Sd = c/(2\omega k)$$

where k is the imaginary part of the refractive index of the material, ω is the angular frequency of light, and c is the speed of light. It should be noted that FIG. 5C shows the case where the material of the scatterer is gold, but, in the case where the material of the scatterer is changed, the minimum of Ps also becomes the above-described skin depth. The above is summarized as follows: the distance Ps between the slider air bearing surface and the magnetic pole bottom surface is preferably set so that Sd<Ps<magnetic pole widths.

Figure 6:
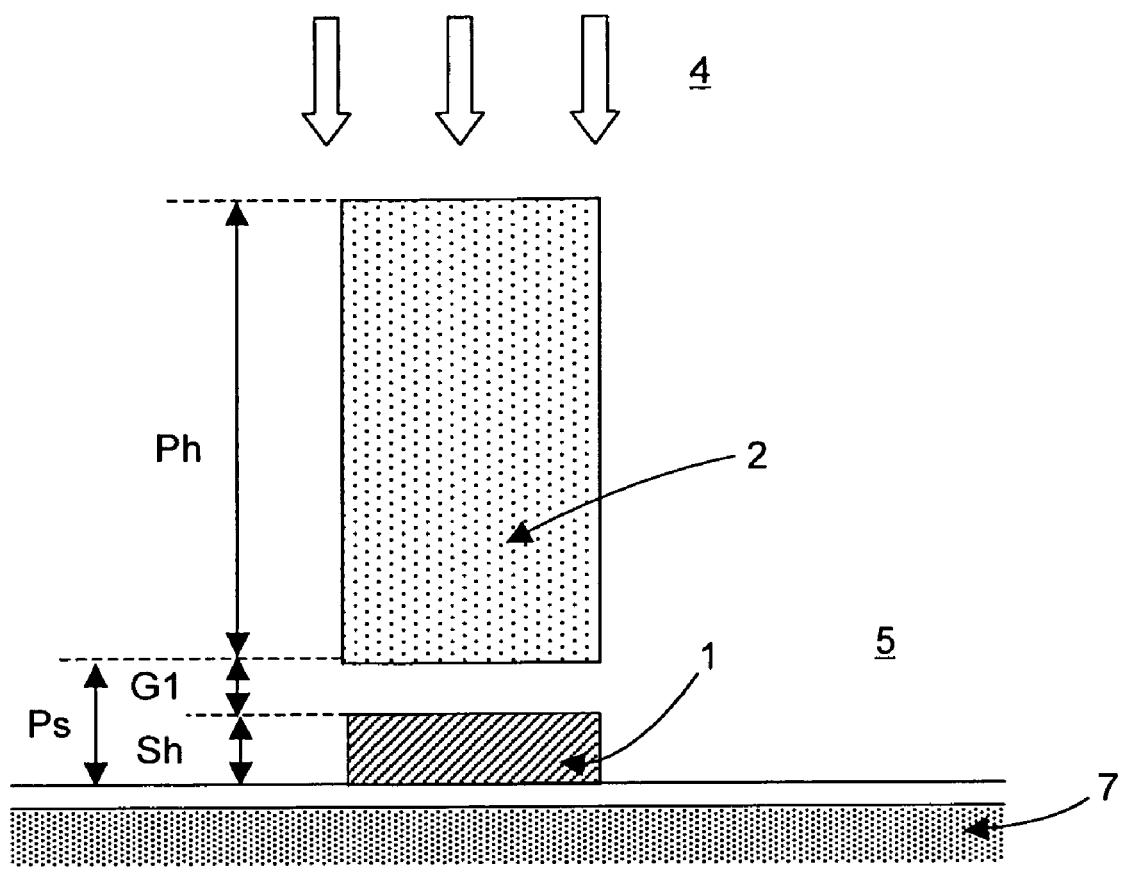
FIG. 6 is a cross-sectional view showing an example in which a gap is provided between the scatterer and the magnetic pole.

Although the magnetic pole 2 and the scatterer 1 were placed in contact with each other in the above-described example, a gap may be provided between the magnetic pole 2 and the scatterer 1 as shown in FIG. 6. Providing a gap in this way facilitates the entrance of the incident light into a region under the magnetic pole. Accordingly, the intensity of the optical near-field generated at the vertex 11 of the scatterer 1 can be made higher. In this example, the thickness Sh of the scatterer 1 was set at 30 nm, and the distance G1 between the scatterer and the magnetic pole was set at 30 nm. Other dimensions of the magnetic pole and the scatterer were the same as in the example of FIG. 3.

Figure 7:
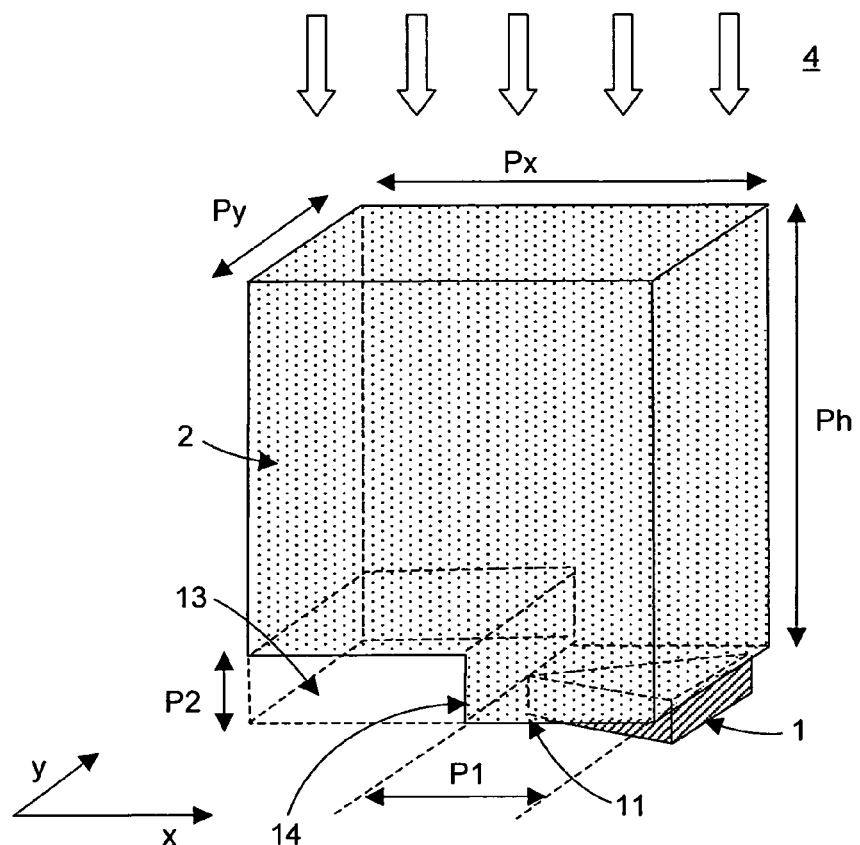
FIG. 7 is a cross-sectional view showing an example in which the x-direction width of the magnetic pole is set larger than a width of the scatterer and in which a lower portion of the magnetic pole is partially removed.

FIG. 7 shows an example of a case where the x-direction width Px of the magnetic pole is made larger than the width Sx of the scatterer, and where a lower portion of the magnetic pole is partially removed. Increasing the width Px of the magnetic pole 2 can increase the intensity of the magnetic field generated. However, in this case, since it becomes difficult for the incident light 4 to enter the scatterer 1, the intensity of the optical near-field generated at the vertex 11 decreases. Accordingly, in this example, in order to reduce a decrease in the intensity, a portion 13 of the lower portion of the magnetic pole 2 is removed. The width Sx of the scatterer 1 was set at 100 nm, and the thickness thereof was set at 30 nm. The angle at the vertex 11 at which the optical near-field was generated was set at 60 degrees. The width Px of the magnetic pole 2 was set at 300 nm, the width Py thereof was set at 100 nm, and the height Ph thereof was set at 400 nm. In order to increase the optical near-field intensity and the magnetic field intensity, it is recommended that the position of the vertex 11 of the scatterer 1 be made to substantially coincide with the position of a step portion 14 of the magnetic pole 2. In this example, a width P1 of the lower hanging portion of the magnetic pole was set at 100 nm, and the height P2 of the removed portion 13 was set at 70 nm.

Figure 8:
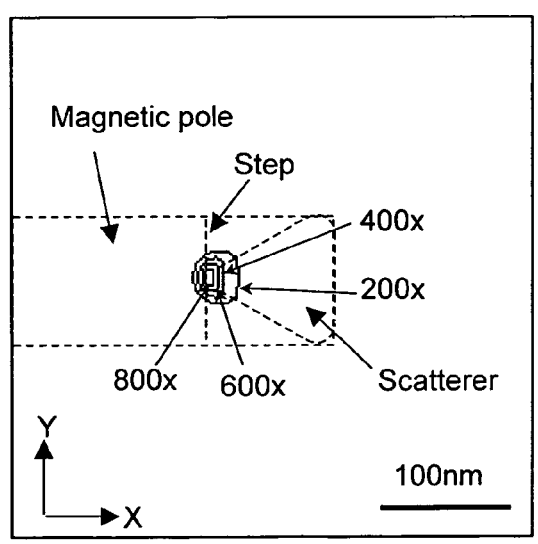
FIG. 8 is a view showing the distribution of optical near-field intensity on the surface of the medium for the case where the x-direction width of the magnetic pole is set larger than the width of the scatterer and where the lower portion of the magnetic pole is partially removed.

FIG. 8 shows the optical near-field intensity distribution in the above-described example. In this calculation, the slider 5 was assumed to be placed on the surface of the magnetic recording medium 7, and the magnetic recording medium 7 was assumed to include the recording layer 8 (material was FePt) having a thickness of 6 nm and the metal layer 9 (material was gold) which was formed under the recording layer 8 and which had a thickness of 30 nm. The distance between the medium surface and the slider bottom surface 6 was assumed to be 8 nm. The wavelength of the incident light was set at 780 nm. The incident light was made incident from directly above (from the direction represented by arrows 4). The direction of polarization was the x direction of FIG. 7. As shown in this drawing, a strong optical near-field was generated near the vertex 11 of the scatterer 1, and the intensity thereof became approximately 800 times the incident light intensity. The spot diameter of the incident light was 15 nm in the x direction and 23 nm in the y direction.

Figure 9:
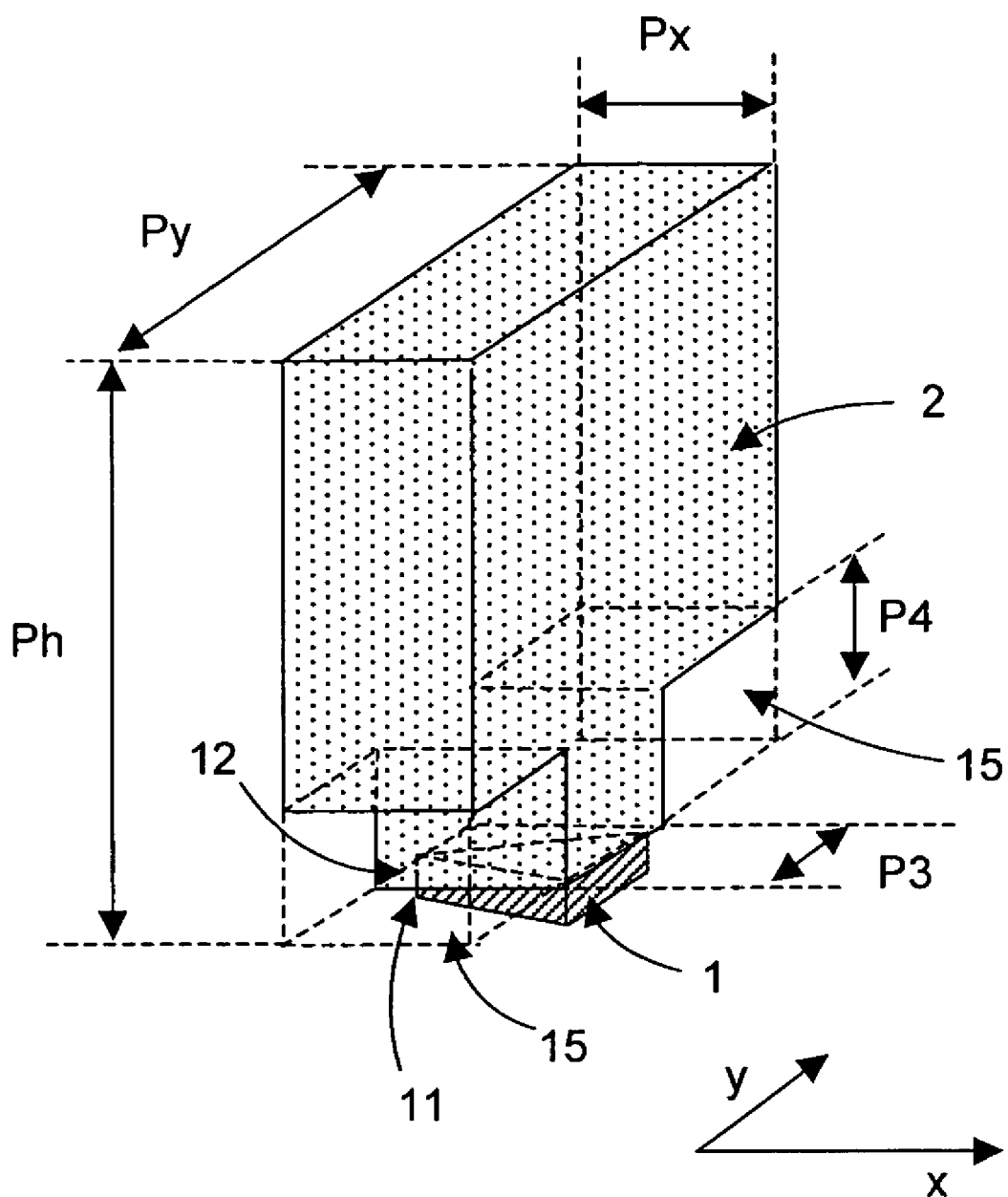
FIG. 9 is a cross-sectional view showing an example in which the y-direction width of the magnetic pole is set larger than a width of the scatterer and in which a lower portion of the magnetic pole is partially removed.

FIG. 9 shows an example of a case where the y-direction width Py of the magnetic pole is made larger than the width Sy of the scatterer, and where a lower portion of the magnetic pole is partially removed. Increasing the width Py of the magnetic pole 2 can increase the intensity of the magnetic field generated. However, in this case, the intensity of the optical near-field generated at the vertex 11 of the scatterer 1 decreases. In this example, in order to reduce a decrease in the optical near-field intensity, portions 15 of the lower portion of the magnetic pole, which were positioned respectively on both sides of the scatterer 1 were removed. Partially removing the lower portion of the magnetic pole 2 in this way facilitates the entrance of the incident light into the scatterer 1, and can therefore prevent a decrease in the optical near-field intensity. In this example, the width Px of the magnetic pole 2 was set at 100 nm, the width Py thereof was set at 300 nm, and the height Ph thereof was set at 500 nm. The width Sx of the scatterer 1 was set at 100 nm, and the thickness thereof was set at 30 nm. The angle at the vertex 11 at which the optical near-field was generated was set at 60 degrees. In order to increase the optical near-field intensity, it is recommended that a width P3 of the lower hanging portion of the magnetic pole be set at a value of not more than the width Sy of the scatterer 1. In this example, the width P3 was set at 100 nm. The height P4 of the lower removed portion 15 of the magnetic pole was set at 50 nm.

Figure 10:
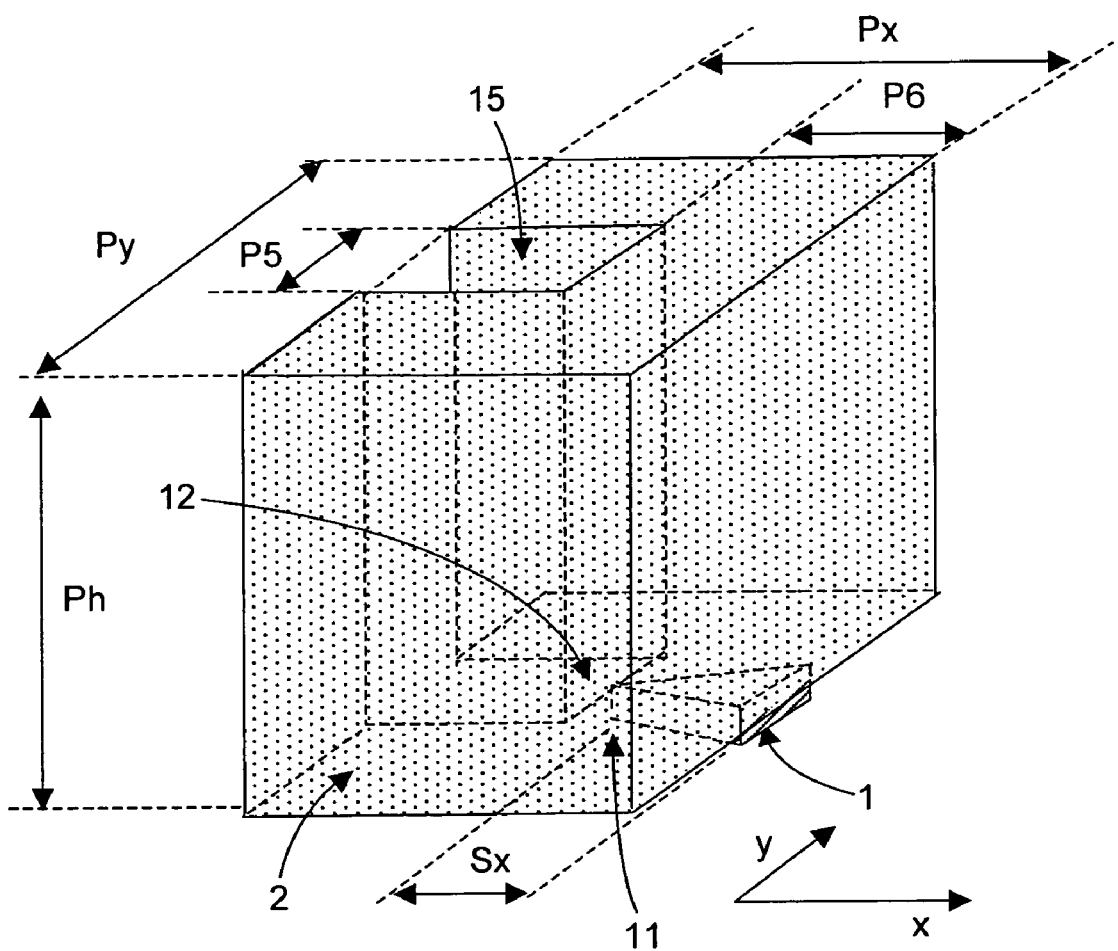
FIG. 10 is a view showing an example in which a C-shaped magnetic pole is used.

FIG. 10 shows an example of a case where a C-shaped magnetic pole is used. If the x- and y-direction widths Px and Py of the magnetic pole 2 are made larger than the widths Sx and Sy of the scatterer in order to increase the magnetic field intensity, the intensity of the optical near-field generated at the vertex 11 decreases. In this example, in order to prevent this, the magnetic pole was partially removed in a portion 15 in the vicinity of the vertex 11 of the scatterer 1 at which the optical near-field was generated, and a resultant C-shaped magnetic pole was used. This makes light come downside through the removed portion 15 and increases the amount of the light entering the scatterer 1. The material of the magnetic pole 2 was FeCo alloy. The width Px thereof was set at 200 nm, the width Py thereof was set at 300 nm, and the height Ph thereof was set at 500 nm. The y-direction width of the removed portion 15 of the magnetic pole 2 was set at 100 nm. In order to increase the optical near-field intensity, it is recommended that a magnetic pole width P6 over the scatterer 1 be set at a value of not more than the width Sx of the scatterer 1, and that the position of the vertex 11 of the scatterer 1 be made to substantially coincide with the position of the end portion 12 of the magnetic pole. The magnetic pole width P6 over the scatterer 1 was set at 100 nm. The width Sx of the scatterer 1 was set at 100 nm, and the thickness thereof was set at 30 nm. The angle at the vertex 11 at which the optical near-field was generated was set at 60 degrees.

Figure 11:
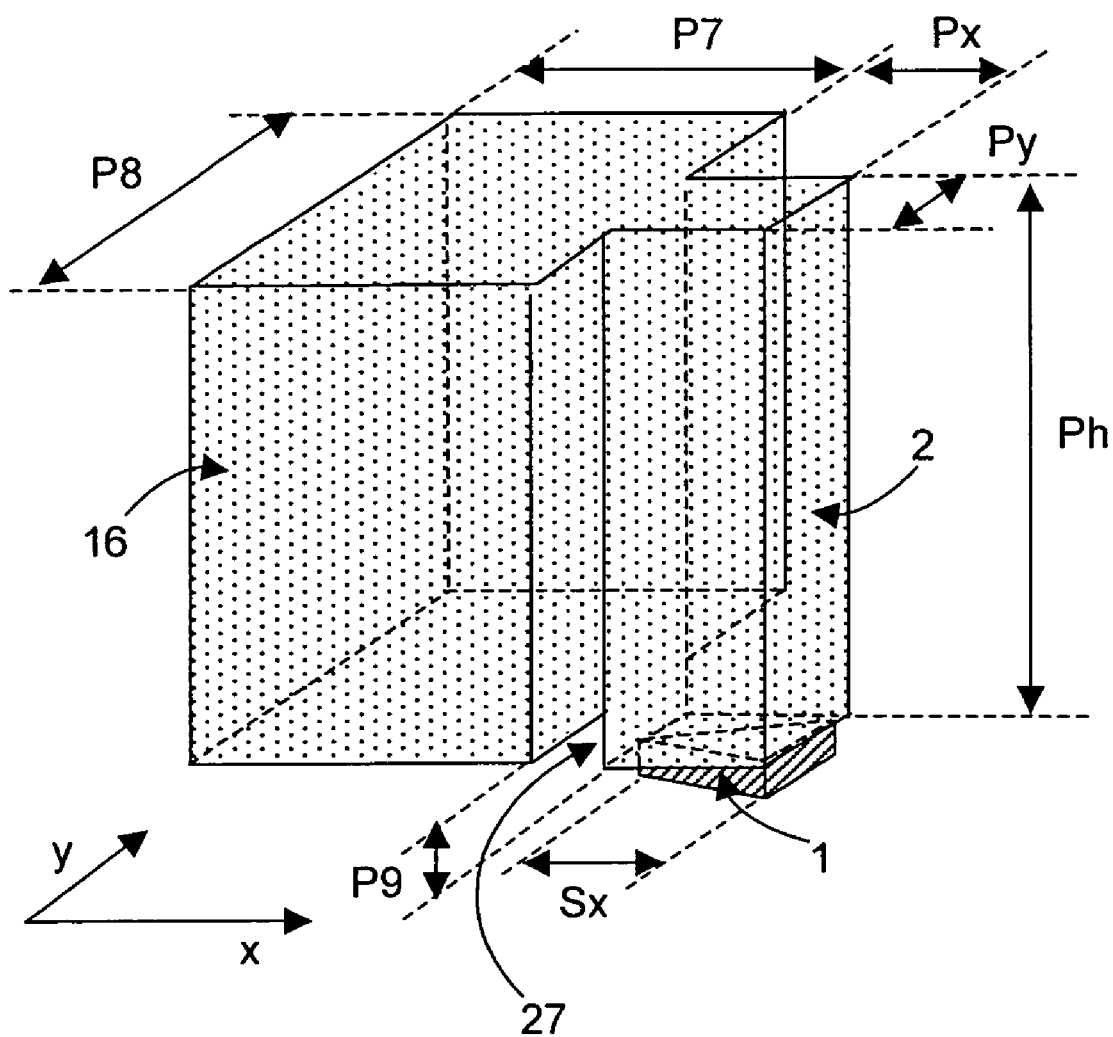
FIG. 11 is a view showing an example in which a T-shaped magnetic pole is used.

FIG. 11 shows an example of a case where a T-shaped magnetic pole is used. In order to generate a strong optical near-field, the widths Px and Py of the magnetic pole 2 over the scatterer 1 need to be made as small as possible. However, the magnetic field intensity decreases accordingly. In order to compensate this, in this example, a magnetic pole 16 having larger widths than the magnetic pole 2 over the scatterer 1 was placed so as to come into contact with the magnetic pole over the scatterer 1, whereby the magnetic pole 2 became T-shaped. The width Sx of the scatterer 1 was set at 100 nm, and the thickness thereof was set at 30 nm. The angle at the vertex 11 of the scatterer 1 at which the optical near-field was generated was set at 60 degrees. In order to increase the optical near-field intensity and the magnetic field intensity, it is recommended that the widths Px and Py of the magnetic pole 2 over the scatterer be set at values of not more than the widths Sx and Sy of the scatterer 1, and that the position of the vertex 11 of the scatterer 1 be made to substantially coincide with the position of a junction 27 between the magnetic pole 2 and the magnetic pole 16 having larger widths. In this example, with regard to dimensions of the magnetic pole 2 over the scatterer 1, the width Px was set at 100 nm, the width Py was set at 100 nm, and the height Ph was set at 500 nm. With regard to dimensions of the magnetic pole 16 having larger widths, a width P7 was set at 150 nm, and a width P8 was set at 300 nm. In order to facilitate the entrance of the incident light, a lower portion of the magnetic pole 16 having larger widths was partially removed. The height P9 of a step portion between the magnetic pole 2 over the scatterer and the magnetic pole 16 having larger widths was set at 50 nm.

Figure 12:
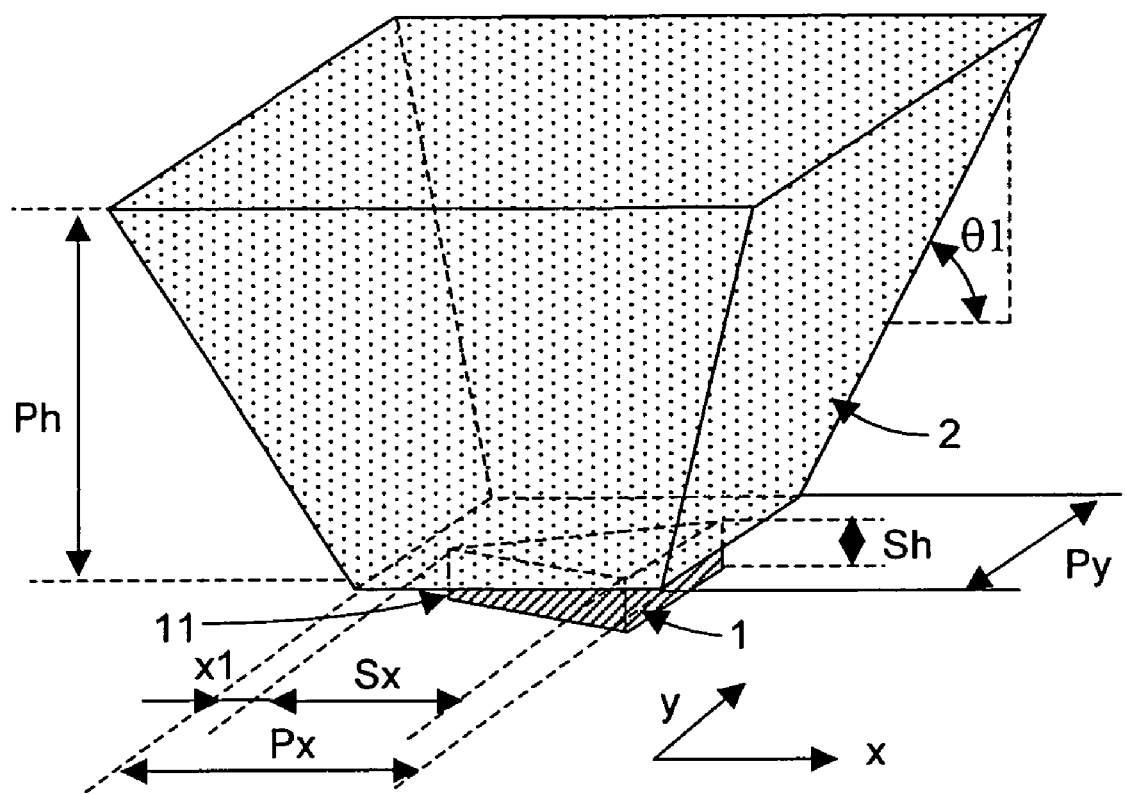
FIG. 12 is a view showing an example in which a magnetic pole having widths decreasing with decreasing distance from the scatterer is used.

FIG. 12 shows an example of a case where the widths of an upper portion of the magnetic pole are made larger than the widths Px and Py of a lower portion thereof. Gradually decreasing the widths of the magnetic pole 2 in this way can increase the magnetic flux density in the lower portion of the magnetic pole. In this example, the shape of the lower portion of the magnetic pole was a square, and both of the widths Px and Py thereof were set at 100 nm. The tilt angles θ1 of side surfaces were set at 60 degrees. The height Ph was set at 600 nm. The material of the scatterer 1 was gold. The length Sx thereof was set at 100 nm, and the thickness Sh thereof was set at 30 nm. The angle at the vertex 11 at which the optical near-field was generated was set at 60 degrees.

Figure 13:
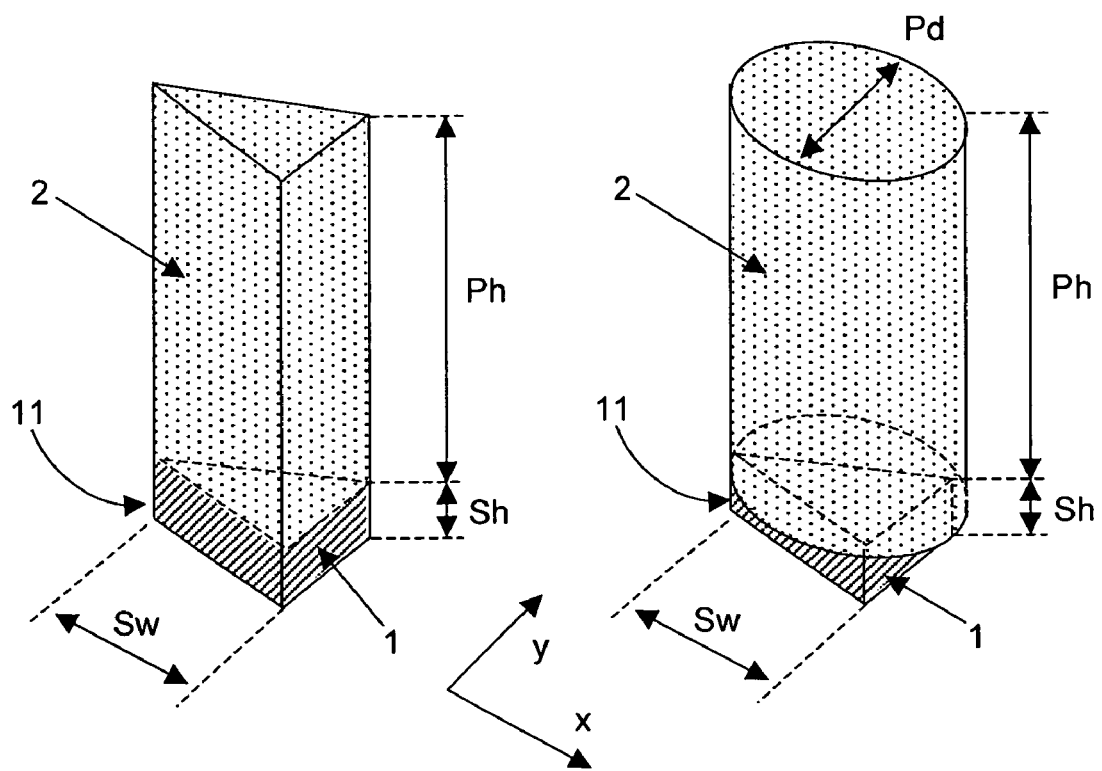
FIGS. 13A and 13B are views showing examples in which a magnetic pole having the shape of a triangular prism or a cylinder is used.

The shape of the above-described magnetic pole may be a triangular prism or a cylinder instead of a cuboid. FIG. 13A shows an example of a case where the shape of the magnetic pole is a triangle. In this example, x- and y-direction dimensions of the magnetic pole 2 were the same as those of the scatterer 1, and end portions of the scatterer 1 and those of the magnetic pole 2 were placed in contact with each other. The material of the scatterer 1 was gold. The length Sx thereof was set at 100 nm, and the thickness Sh thereof was set at 30 nm. The angle at the vertex 11 at which the optical near-field was generated was set at 60 degrees. The material of the magnetic pole 2 was FeCo alloy, and the thickness Ph thereof was set at 500 nm. FIG. 13B shows an example of a case where the shape of the magnetic pole is a cylinder. Dimensions of the scatterer 1 were the same as in the above-described case where the shape of the magnetic pole 2 was a triangle. The material of the magnetic pole 2 was FeCo alloy. The diameter Pd thereof was set at 150 nm, and the height Ph thereof was set at 500 nm.

Example 2

Next, examples will be described for the case where the shape of the scatterer is changed.

Figure 14:
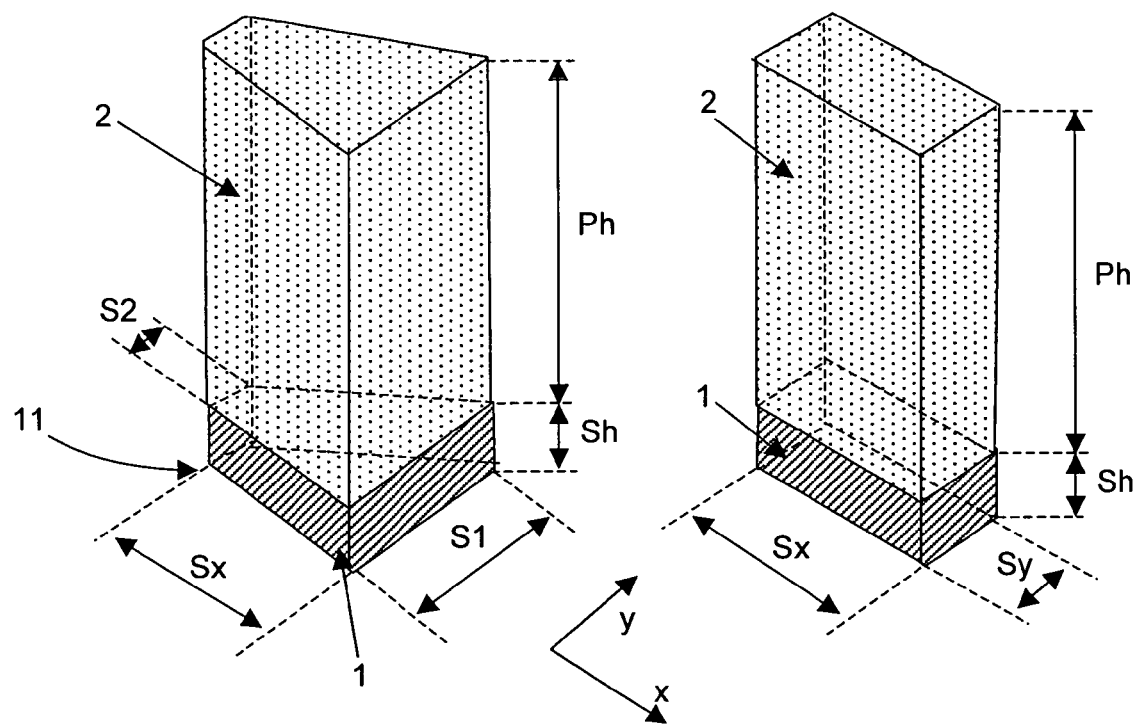
FIGS. 14A and 14B are views showing examples in which a scatterer having a trapezoidal or rectangular shape is used.

The shape of the scatterer may be a trapezoid, a rectangle, an ellipse, a sphere, or the like instead of a triangle. FIG. 14A shows an example of a case where the shape of the scatterer is a trapezoid. The material of the scatterer 1 was gold. The length Sx thereof was set at 100 nm, the upper base length S2 thereof was set at 40 nm, the lower base length S1 thereof was set at 100 nm, and the thickness Sh thereof was set at 30 nm. The shape of the magnetic pole 2 was also a trapezoid, and x- and y-direction dimensions thereof were the same as those of the scatterer 1. The scatterer 1 and the magnetic pole 2 were placed one on top of the other. The thickness Ph of the magnetic pole 2 was set at 500 nm. The material of the magnetic pole 2 was FeCo alloy. Light which was polarized in the x direction and had a wavelength of 780 nm was made incident from above, thus generating an optical near-field at the vertex 11 of the scatterer 1. FIG. 14B shows an example of a case where the shape of the scatterer is a rectangle. The material of the scatterer 1 was gold. The x-direction width Sx thereof was set at 100 nm, the y-direction width Sy thereof was set at 30 nm, and the thickness Sh thereof was set at 30 nm. The shape of the magnetic pole 2 was a cuboid, and x- and y-direction dimensions thereof were the same as those of the scatterer 1. The scatterer 1 and the magnetic pole 2 were placed one on top of the other. The thickness Ph of the magnetic pole 2 was set at 500 nm. The material of the magnetic pole 2 was FeCo alloy. Light having a wavelength of 780 nm was made incident from above, and the direction of polarization was the x direction.

Figure 15:
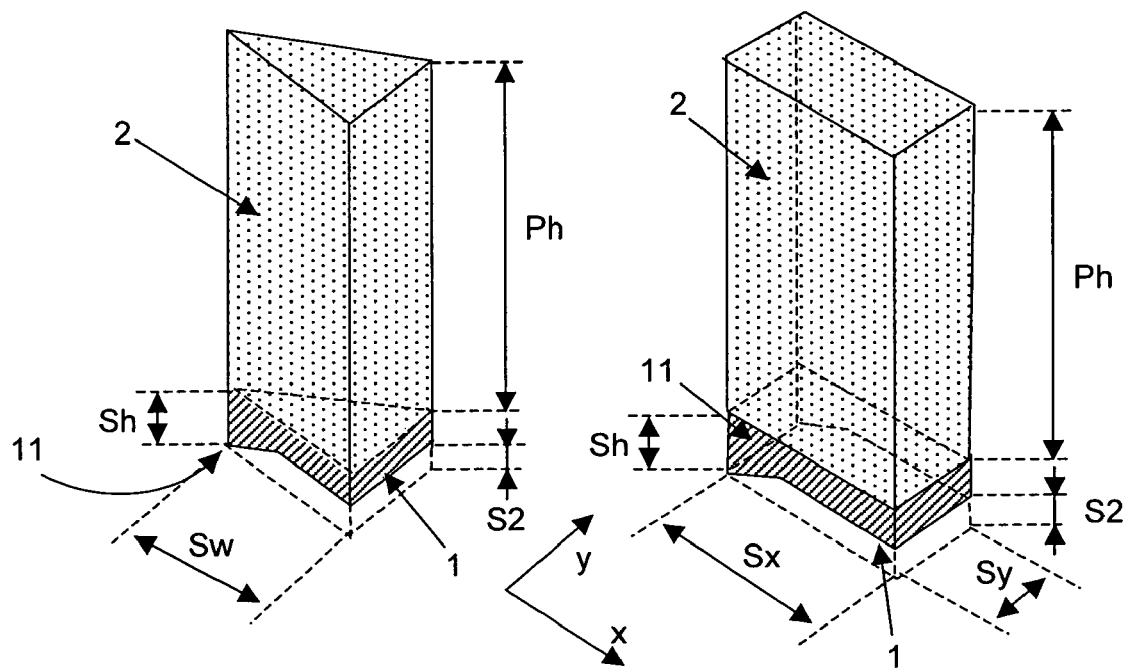
FIGS. 15A and 15B are views showing examples of a case where a scatterer having a surface cut away except for the vicinity of a vertex at which an optical near-field is generated is used.

In order to further reduce the size of the optical near-field spot, a surface of the scatterer may be partially cut away as disclosed in Japanese Unexamined Patent Publication No. 2004-151046. FIG. 15A shows an example of a case where a surface of a scatterer having a triangular shape is cut away. The material of the scatterer 1 was gold. The length Sx thereof was set at 100 nm, and the thickness Sh thereof was set at 50 nm. The angle at the vertex 11 at which the optical near-field was generated was set at 60 degrees. The surface was cut away except for the vertex 11. The cutting depth S2 was set at 15 nm. The material of the magnetic pole 2 was FeCo alloy, and the shape of the magnetic pole was a triangular prism. X- and y-direction dimensions of the magnetic pole were the same as those of the scatterer, and the height Ph of the magnetic pole was set at 400 nm. Light having a wavelength of 780 nm was made incident from above, and the direction of polarization was the x direction. FIG. 15B shows an example of a case where a surface of a scatterer having a rectangular shape is cut away. The material of the scatterer 1 was gold. The x-direction width Sx thereof was set at 100 nm, the y-direction width Sy thereof was set at 30 nm, and the thickness Sh thereof was set at 50 nm. The cutting depth S2 was set at 15 nm. The material of the magnetic pole 2 was FeCo alloy, and the shape of the magnetic pole was a cuboid. X- and y-direction dimensions of the magnetic pole were the same as those of the scatterer, and the height Ph of the magnetic pole was set at 400 nm. Light having a wavelength of 780 nm was made incident from above, and the direction of polarization was the x direction.

Example 3

Figure 16:
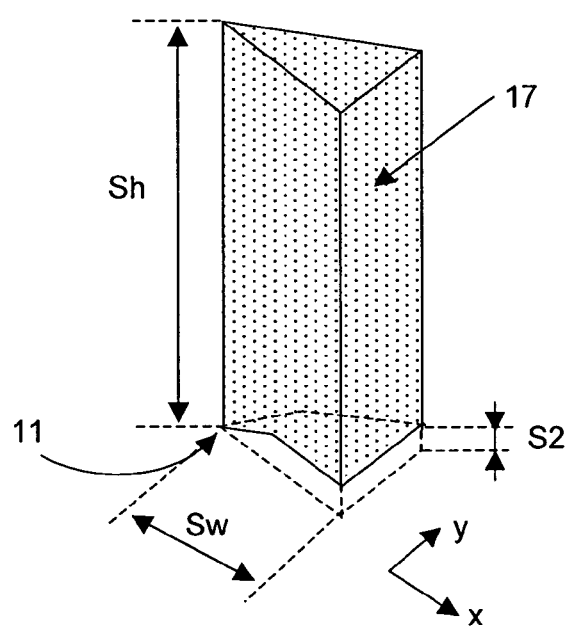
FIGS. 16A and 16B are views showing an example of a case where a scatterer is made of a soft magnetic material.
Figure 16:
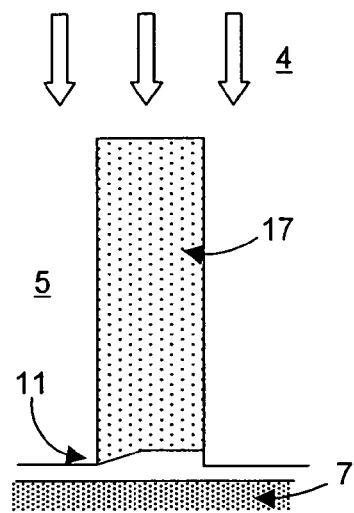

Next, examples will be described for cases where the scatterer is of a soft magnetic material. The material of the scatterer may be changed to a soft magnetic material. FIGS. 16A and 16B show an example of a case where the material of the scatterer is FeCo alloy and where the scatterer also serves as a magnetic pole. Since FeCo alloy has conductivity, an optical near-field can be generated at the vertex 11 as in the case where metal such as gold is used. This can reduce the distance between the magnetic pole (scatterer) and the medium, and can therefore increase the intensity of the magnetic field applied to the medium.

In this example, the shape of a scatterer 17 made of a soft magnetic material was a triangle. Adjusting the length Sx of the scatterer 17 so that plasmon resonance occurs can increase the intensity of the optical near-field generated at the vertex 11. In this example, Sx was set at 140 nm. The thickness Sh of the scatterer was set at 500 nm, and the angle at the vertex 11 at which the optical near-field was generated was set at 60 degrees. In order to reduce the light spot diameter, a surface of the scatterer was cut away to leave the vertex 11 as in the case of FIG. 15. The cutting depth S2 was set at 15 nm. The wavelength of incident light was set at 780 nm, and the incident light was made incident from above the scatterer (in the direction represented by arrows 4). The direction of polarization was the x direction. The material of the above-described scatterer may be anything as long as it is a soft magnetic material having conductivity, and may be FeCoNi alloy, FeNi alloy, FeNiMo alloy, FeNiCrCu alloy, FeNiNb alloy, FeCoPd alloy, Fe, FeSi alloy, FeAl alloy, FeSiAl alloy, or a ferrite compound.

Figure 17:
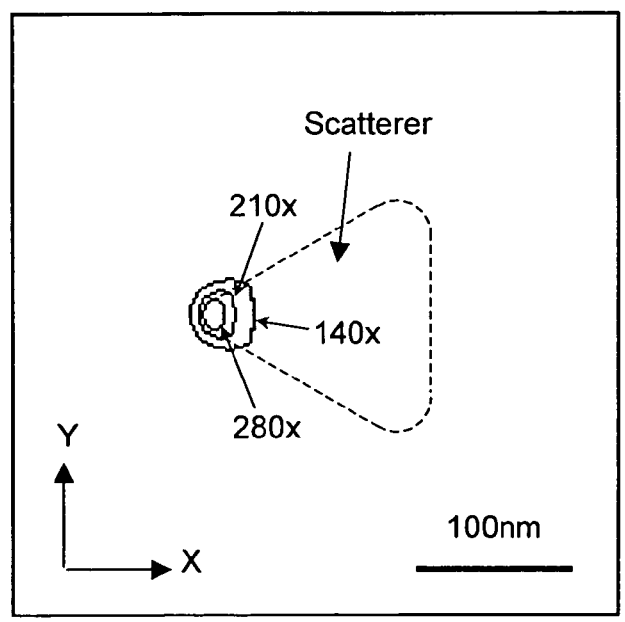
FIG. 17 is a view showing the distribution of optical near-field intensity on the surface of the medium for the case where the scatterer is made of the soft magnetic material.

FIG. 17 shows the optical near-field intensity distribution in the above-described example. In this calculation, the slider 5 was assumed to be placed on the surface of the magnetic recording medium 7, and the magnetic medium 7 was assumed to include the recording layer 8 (material was FePt) having a thickness of 6 nm and the metal layer 9 (material was gold) which was formed under the recording layer 8 and which had a thickness of 30 nm. The distance between the medium surface and the slider bottom surface 6 was assumed to be 8 nm. The wavelength of incident light was set at 780 nm, and the incident light was made incident from directly above (in the direction represented by arrows 4). The direction of polarization was the x direction of FIG. 16. As shown in this drawing, a strong optical near-field was generated near the vertex 11 of the scatterer, and the intensity thereof became approximately 280 times the incident light intensity. The spot diameter was 15 nm in the x direction and 23 nm in the y direction.

In the case where the material of the scatterer is a soft magnetic material, since the conductivity of a soft magnetic material is generally low, the intensity of the optical near-field generated at the vertex 11 decreases. In order to prevent this, a part of the scatterer made of a soft magnetic material may be replaced by a material having a higher conductivity than the soft magnetic material. FIGS. 18A and 18B show an example of a case where a portion 18 made of gold is formed inside the scatterer 17 made of a soft magnetic material. The material of the scatterer 17 made of the soft magnetic material was FeCo alloy, and the shape thereof was a triangle. The length Sx thereof was set at 140 nm, and the height Sh thereof was set at 500 nm. The angle at the vertex 11 at which the optical near-field was generated was set at 60 degrees. In order to reduce the diameter of a light spot, the surface of the scatterer was cut away except the vertex 11 as in the case of FIG. 15. The cutting depth S2 was set at 15 nm. The shape of the gold portion 18 was the same as that of the scatterer 17. The length S4 thereof was set at 100 nm, and the height S3 thereof was set at 50 nm. The wavelength of incident light was set at 780 nm, and the incident light was made incident from above the scatterer (in the direction represented by arrows 4). The direction of polarization was the x direction. The material of the high-conductivity portion 18 formed inside may be anything as long as it has a higher conductivity than the soft magnetic material constituting the scatterer 17, and, for example, may be silver, aluminum, or copper. The height S3 of the high-conductivity portion 18 formed inside may be further increased, and the inside of the scatterer 17 may be fully filled with the high-conductivity material so that S3=Sh.

Example 4

Next, examples will be described for cases where a second scatterer is placed near the vertex 11 of the scatterer at which the optical near-field is generated.

Figure 19:
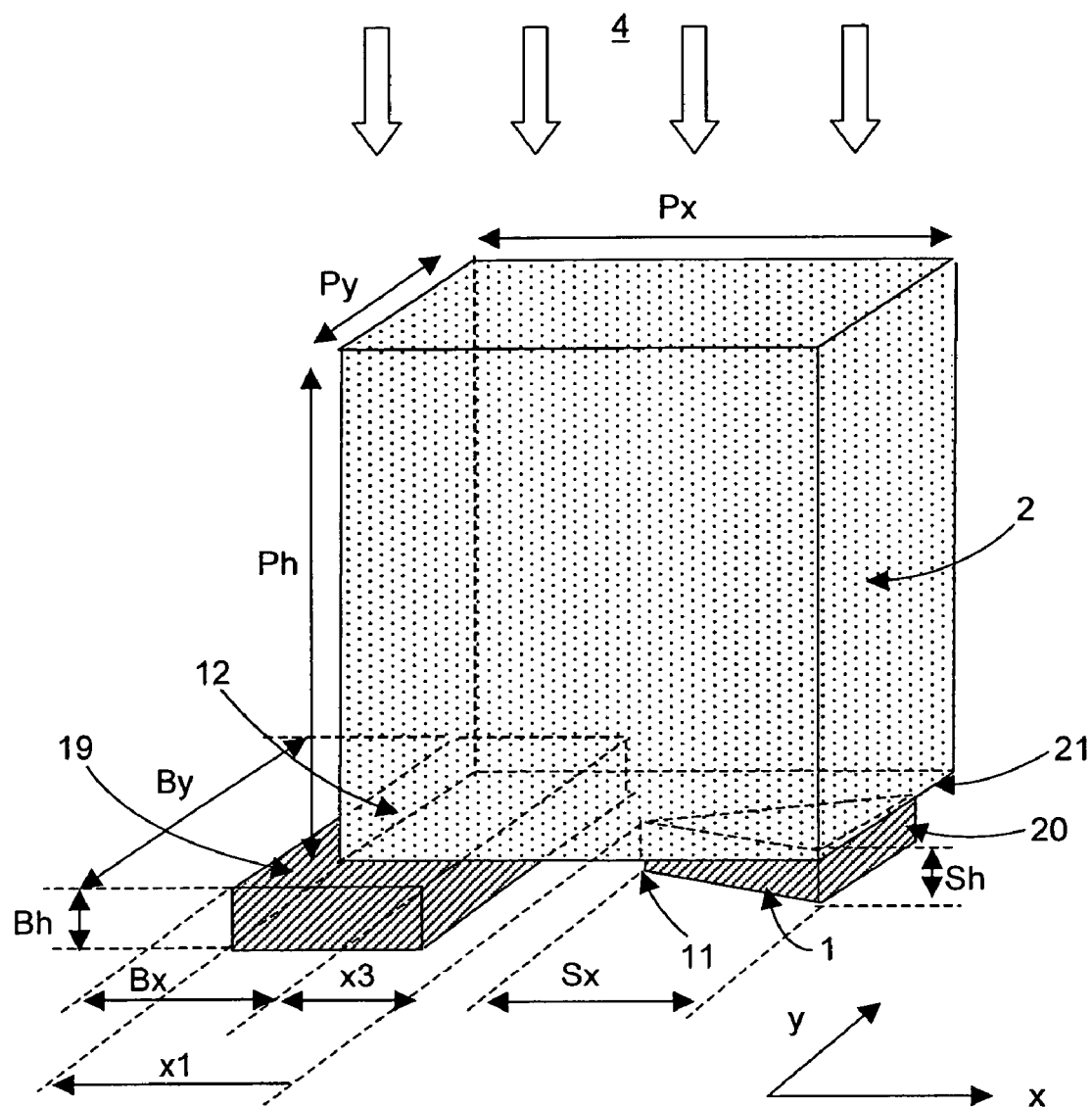
FIG. 19 is a view showing an example of a case where a second scatterer is formed under a magnetic pole.

As shown in FIG. 19, in the case where a second scatterer 19 having conductivity is placed near the vertex 11 of the scatterer 1 at which an optical near-field is generated, the second scatterer 19 has the function of attracting the energy of incident light into the bottom of magnetic pole 2. Accordingly, it becomes possible to generate a strong optical near-field even in the case where the vertex 11 of the scatterer 1 for generating the optical near-field is positioned inside the magnetic pole 2. That is, it becomes possible to heat a portion near the center of the magnetic pole 2. Since magnetic field intensity increases as the distance to the center of the magnetic pole decreases, it becomes possible to apply a stronger magnetic field to a heated region.

In this example, the scatterer 1 having a triangular shape was placed under the magnetic pole 2 having the shape of a cuboid, and a scatterer 19 having the shape of a cuboid was placed near the vertex 11 at which the optical near-field was generated. The material of the scatterer 1 was gold. The width Sx thereof was set at 100 nm, and the thickness Sh thereof was set at 30 nm. The angle at the vertex 11 at which the optical near-field was generated was set at 60 degrees. The magnetic pole 2 had the shape of a cuboid, and was placed in contact with the scatterer 1. The x-direction width Px of the magnetic pole was set at 200 nm, the y-direction width Py thereof was set at 100 nm, and the height Ph thereof was set at 400 nm. The material of the second scatterer 19 was gold. The x-direction width Bx thereof was set at 150 nm, the y-direction width By thereof was set at 100 nm, and the thickness Bh thereof was set at 30 nm. The distance x3 from the vertex 11 of the scatterer 1 at which the optical near-field was generated to an end portion of the second scatterer was set at 50 nm. Incident light was made incident from above the magnetic pole (in the direction represented by arrows 4), and the direction of polarization was the x direction. The wavelength of the incident light was set at 780 nm. The material of the second scatterer was gold in the above-described example, but may be other material. Other metal such as aluminum, silver, copper, or silicon or a semiconductor may be employed.

Figure 20:
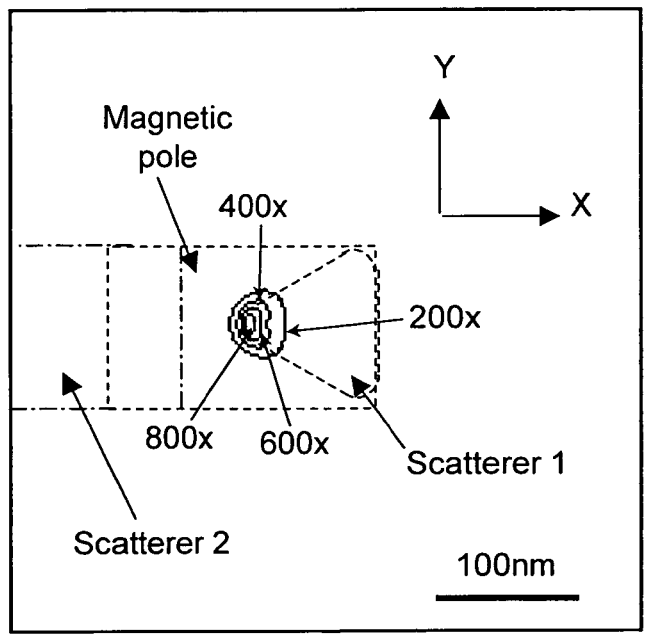
FIG. 20 is a view showing the distribution of optical near-field intensity on the surface of the medium for the case where the second scatterer is formed under the magnetic pole.

FIG. 20 shows the result of calculating the intensity distribution of the optical near-field generated by the above-described structure. In this calculation, the slider 5 was assumed to be placed on the surface of the magnetic recording medium, the thickness of the recording layer 8 was assumed to be 6 nm, the thickness of the metal layer 9 (material is gold) formed under the recording layer 8 was assumed to be 30 nm, and the distance between the medium surface and the slider bottom surface 6 was assumed to be 8 nm. As shown in this drawing, a strong optical near-field can be generated near the center of the magnetic pole, and the intensity of the optical near-field generated near the vertex 11 of the scatterer 1 became 800 or more times the incident light intensity.

Figure 21:
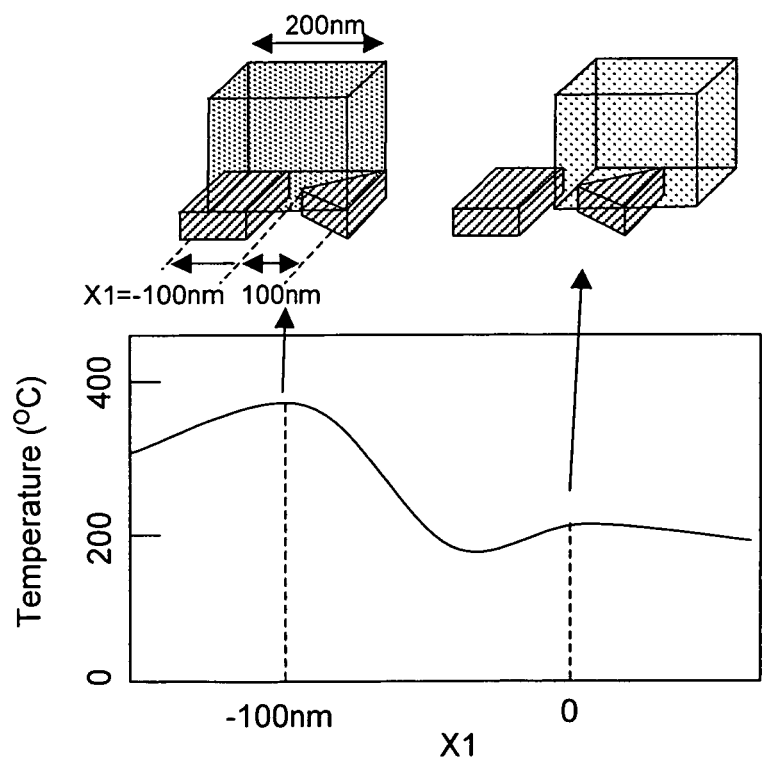
FIG. 21 is a view showing a relationship which exists between the magnetic pole-scatterer distance and medium surface temperature in a case where the second scatterer is formed under the magnetic pole.

FIG. 21 shows the result of calculating the relationship between the position x1 of an end portion of the magnetic pole with respect to the vertex 11 of the scatterer 1 at which the optical near-field is generated and the intensity of the optical near-field generated at the vertex 11. In FIG. 19, the position x1 of the end portion 12 of the magnetic pole 2 was positive in the case where the end portion 12 of the magnetic pole 2 was positioned at the right side of the vertex 11 of the scatterer 1 at which the optical near-field was generated, and was negative in the case where the end portion 12 of the magnetic pole 2 was positioned at the left side thereof. As shown in this graph, in addition to a peak near x1=0 such as in Example 1, another peak exists at x1=−100 nm. Here, the x-direction width Px of the magnetic pole was set at 200 nm, and the width Sx of the first scatterer was set at 100 nm. Accordingly, this position where x1=−100 nm corresponds to a position where the end portion 20 of the scatterer 1 which is opposite to the vertex 11 where the optical near-field is generated substantially coincides with the end portion 21 of the magnetic pole. That is, when the end portion 20 of the scatterer 1 which is positioned opposite to the vertex 11 where the optical near-field is generated substantially coincides with the end portion 21 of the magnetic pole, the intensity of the optical near-field generated at the vertex 11 becomes maximum.

As in the example of FIG. 3, the y-direction width Py of the magnetic pole is preferably set at a value of not less than the distance Ps between the slider air bearing surface and the magnetic pole bottom surface and not more than 500 nm. However, since the second scatterer has the function of pulling the energy of the incident light toward the center of the magnetic pole, even if the x-direction width increases, the intensity of the optical near-field does not greatly decrease. Accordingly, Px only needs to be not less than the distance Ps between the slider air bearing surface and the magnetic pole bottom surface.

Figure 22:
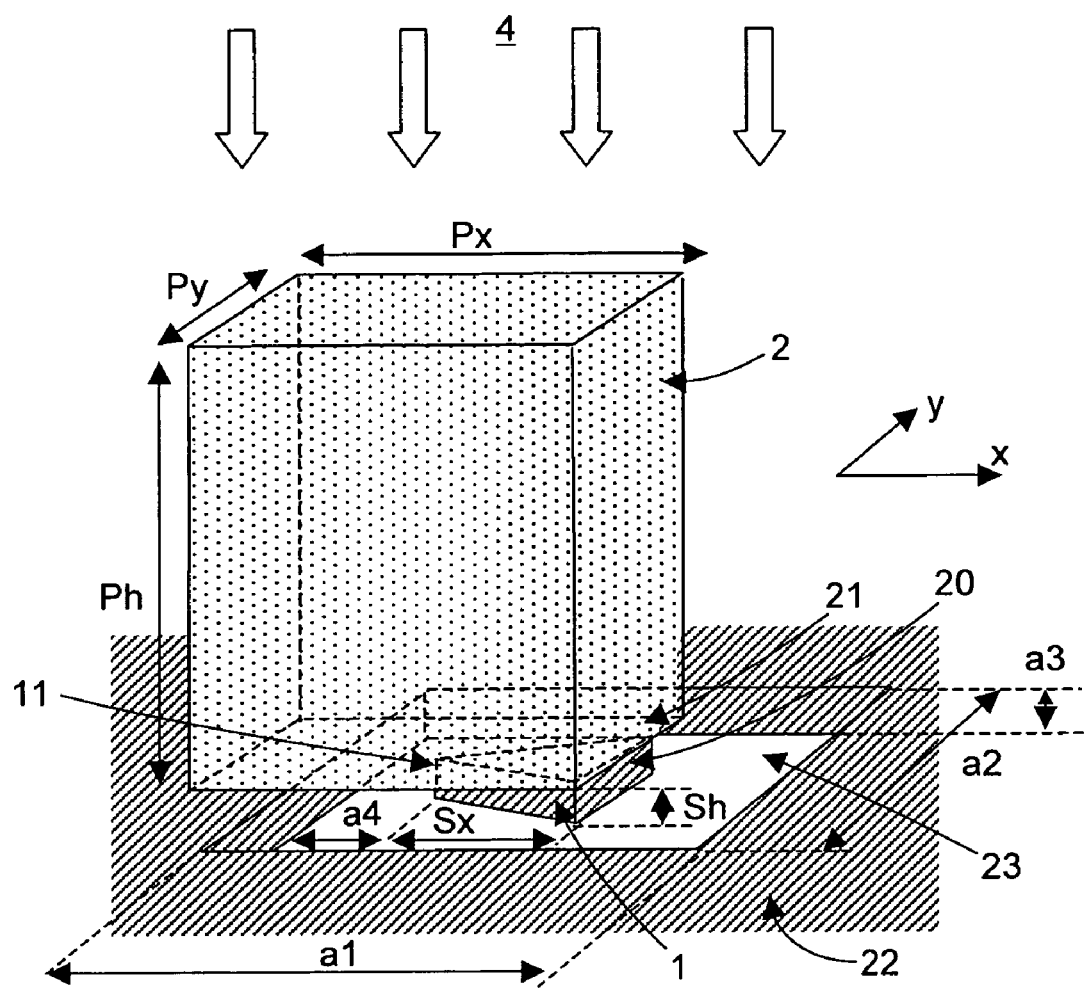
FIG. 22 is a view showing an example of a case where a shield is formed around a scatterer and where the shape of the scatterer is a triangle.

FIG. 22 shows an example of a case where the above-described second scatterer is replaced by a shield 22 for reducing background light. When light enters the scatterer 1 for generating an optical near-field, the light which does not strike the scatterer enters the medium as background light, and the struck region is heated. In order to reduce this background light, it is recommended that the film 22 having a shielding effect be provided around the scatterer 1. This shield 22 has the same function as the second scatterer for attracting the energy of the incident light into the magnetic pole 2. In this example, the shield 22 having a rectangular opening was formed around the scatterer 1 having a triangular shape. The material of the scatterer 1 was gold. The width Sx thereof was set at 100 nm, and the thickness Sh thereof was set at 50 nm. The angle at the vertex 11 at which the optical near-field was generated was set at 60 degrees. The material of the shield was gold. The x-direction width a1 of the opening portion 23 was set at 210 nm, and the y-direction width a2 thereof was set at 240 nm. The distance a4 between the vertex 11 at which the optical near-field was generated and the shield 22 was set at 20 nm. The thickness a3 of the shield 22 was set at 50 nm. The magnetic pole 2 had the shape of a cuboid, and was placed in contact with the scatterer 1. The end portion 20 of the scatterer 1 which was opposite to the vertex 11 where the optical near-field was generated and the end portion 21 of the magnetic pole 2 were placed to substantially coincide with each other. The material of the magnetic pole was FeCo alloy. The x-direction width Px thereof was set at 200 nm, the y-direction width Py thereof was set at 100 nm, and the height Ph thereof was set at 400 nm. The incident light was made incident from above the magnetic pole (in the direction represented by arrows 4), and the direction of polarization was the x direction. The wavelength of the incident light was set at 780 nm.

Figure 23:
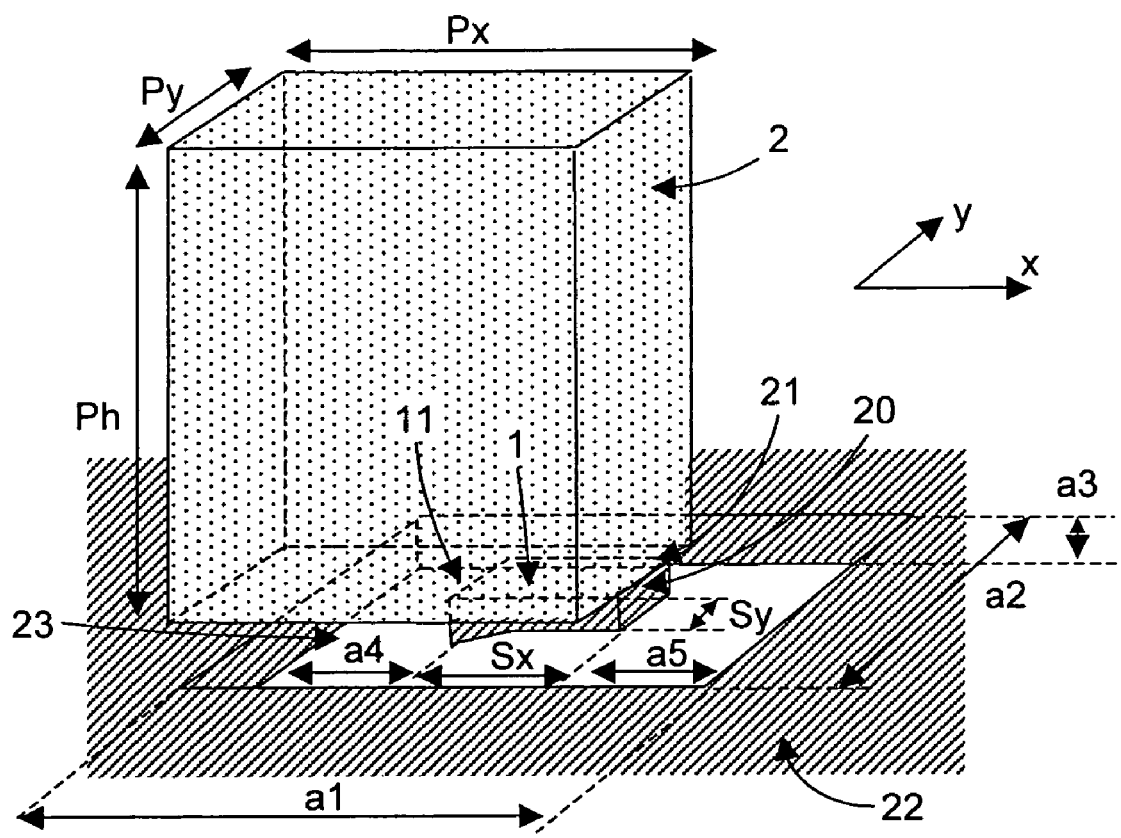
FIG. 23 is a view showing an example of a case where a shield is formed around a scatterer and where the shape of the scatterer is a rectangle.

In the case where the above-described shield is formed, the shape of the scatterer 1 may be a trapezoid, a rectangle, or an ellipse. FIG. 23 shows an example of a case where the shape of the scatterer is a rectangle, and where the surface of the scatterer is cut away except for the vertex 11 at which the optical near-field is generated as in the case of FIG. 15. The material of the scatterer 1 was gold. The width Sx thereof was set at 90 nm, the width Sy thereof was set at 30 nm, and the thickness Sh thereof was set at 50 nm. The amount S2 by which the surface was cut away was set at 14 nm. The magnetic pole 2 had the shape of a cuboid, and was placed in contact with the scatterer 1. The end portion 20 of the scatterer 1 which was opposite to the vertex 11 where the optical near-field was generated and the end portion 21 of the magnetic pole 2 were placed to substantially coincide with each other. The material of the shield 22 was gold. The x-direction width a1 of the opening portion 23 was set at 230 nm, and the y-direction width a2 thereof was set at 250 nm. The distance a4 between the vertex 11 and the shield was set at 40 nm. The thickness a3 of the shield 22 was set at 50 nm. The material of the magnetic pole 2 was FeCo alloy. The x-direction width Px thereof was set at 200 nm, the y-direction width Py thereof was set at 100 nm, and the height Ph thereof was set at 500 nm. The incident light was made incident from above the magnetic pole (in the direction represented by arrows 4), and the direction of polarization was the x direction. The wavelength of the incident light was set at 780 nm. It should be noted that in the case where the above-described shield is used, the distance a5 between the end portion 20 of the scatterer 1 which is opposite to the vertex 11 and the shield may be set at 0 in order to reduce the area of the opening portion and improve the shielding performance.

Figure 24:
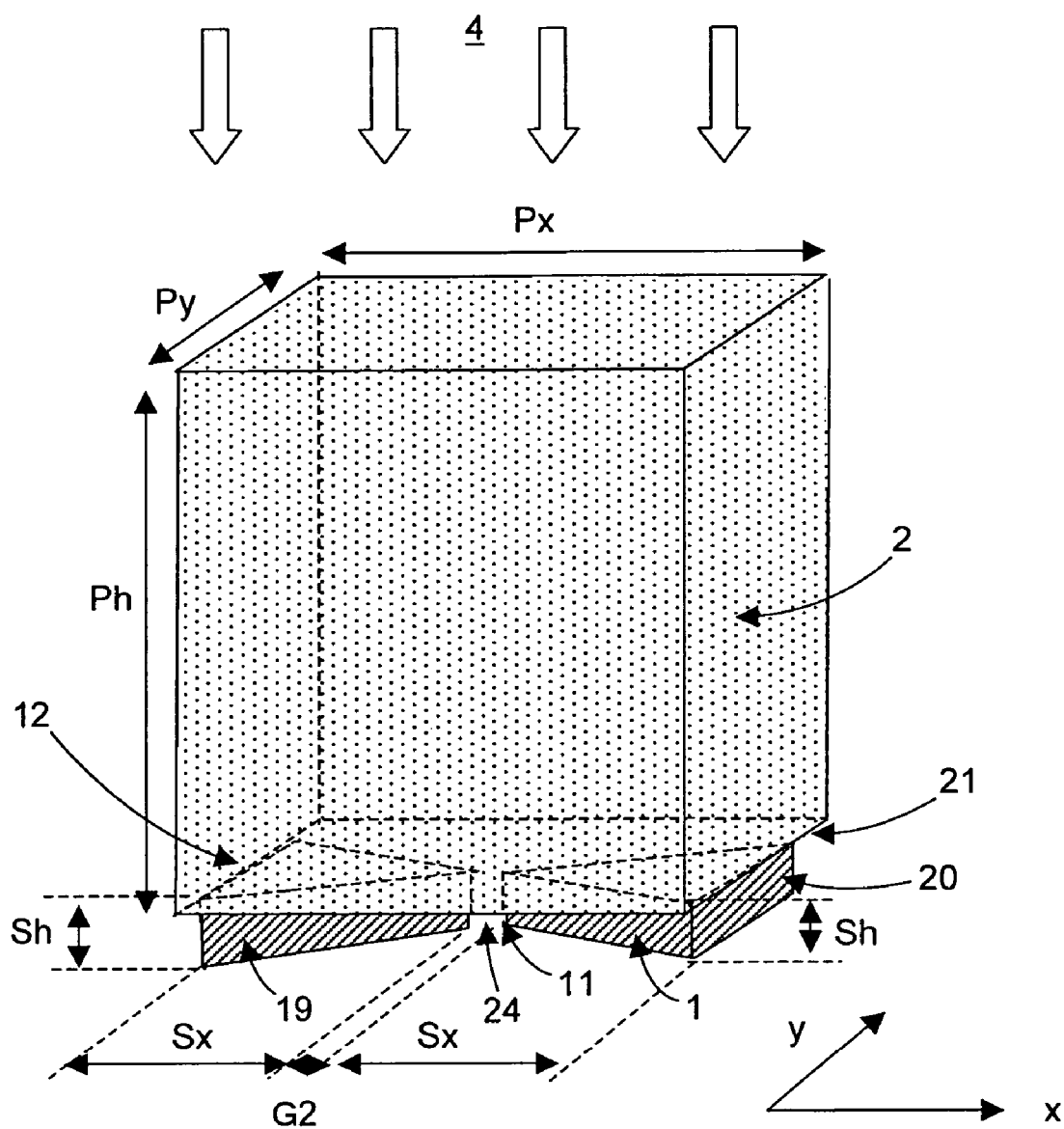
FIG. 24 is a view showing an example of a case where two scatterers having triangular shapes are placed under a magnetic pole to face each other.

FIG. 24 shows an example in which the first scatterer 1 has a shape that gradually becomes narrower with decreasing distance from the tip thereof and has conductivity, and in which the second scatterer 19 also has a shape that gradually becomes narrower with decreasing distance from the tip thereof and has conductivity. In such a structure, charges collected at the respective vertexes 11 of the scatterers interact each other to generate an optical near-field in a space 24 between the two vertexes. In this example, it is recommended that dimensions of the scatterers 1 and 19 be adjusted so that a plasmon is excited in each scatterer. This makes it possible to generate a stronger optical near-field in the space 24 between the two vertexes. Moreover, as in the example of FIG. 19, in order to increase the optical near-field intensity, it is recommended that the scatterers 1 and 19 be placed so that the end portions 20 of the scatterers which are opposite to the vertexes 11 substantially coincide with the end portions 21 and 12 of the magnetic pole 2. In this example, the shapes of both scatterers 1 and 19 were triangles. The material thereof was gold. The length Sx thereof was set at 100 nm, and the thickness Sh thereof was set at 30 nm. The width G2 of the space 24 between the two vertexes was set at 10 nm. The magnetic pole 2 had the shape of a cuboid, and was placed in contact with the scatterers 1 and 19. The material of the magnetic pole was FeCo alloy. The x-direction width Px thereof was set at 210 nm, the y-direction width Py thereof was set at 100 nm, and the height Ph thereof was set at 400 nm. The incident light was made incident from above the magnetic pole (in the direction represented by arrows 4), and the direction of polarization was the x direction. The wavelength of the incident light was set at 780 nm.

Figure 25:
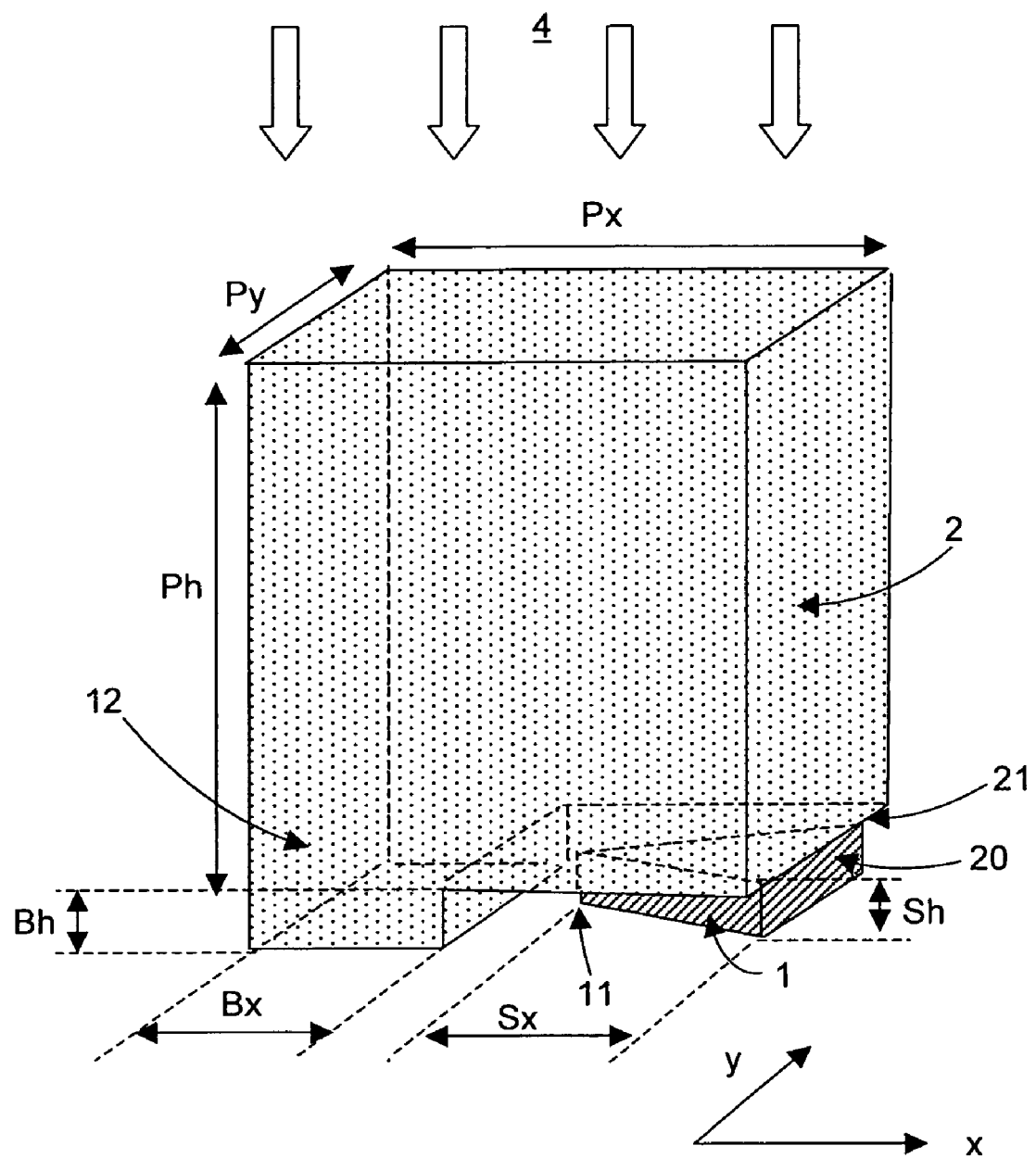
FIG. 25 is a view showing an example of a case where the material of a second scatterer formed under a magnetic pole is a soft magnetic material.

The above-described second scatterer 19 may be of a soft magnetic material, or the second scatterer 19 and the magnetic pole 2 may be integrated as shown in FIG. 25. In this example, the shape, material, and dimensions of the scatterer 1 were the same as those in the example of FIG. 19. With regard to dimensions of the magnetic pole, Px was set at 200 nm, Py was set at 100 nm, Bx was set at 70 nm, and Bh was set at 30 nm.

Example 5

Next, an example will be described for the case where a reflective film is formed on the upper surface or the side surfaces of the magnetic pole.

When the magnetic pole provided on the scatterer is irradiated with light, the magnetic pole absorbs the light and may be thermally expanded. If the magnetic pole is thermally expanded in this way, the scatterer protrudes from the air bearing surface of the slider, and may damage the medium. In order to prevent such heating of the magnetic pole, it is recommended that the upper surface of the magnetic pole, the side surfaces thereof, or both be covered with a reflective film. Here, the reflective film means a film having a higher reflectance of incident light than the magnetic pole.

Figure 26:
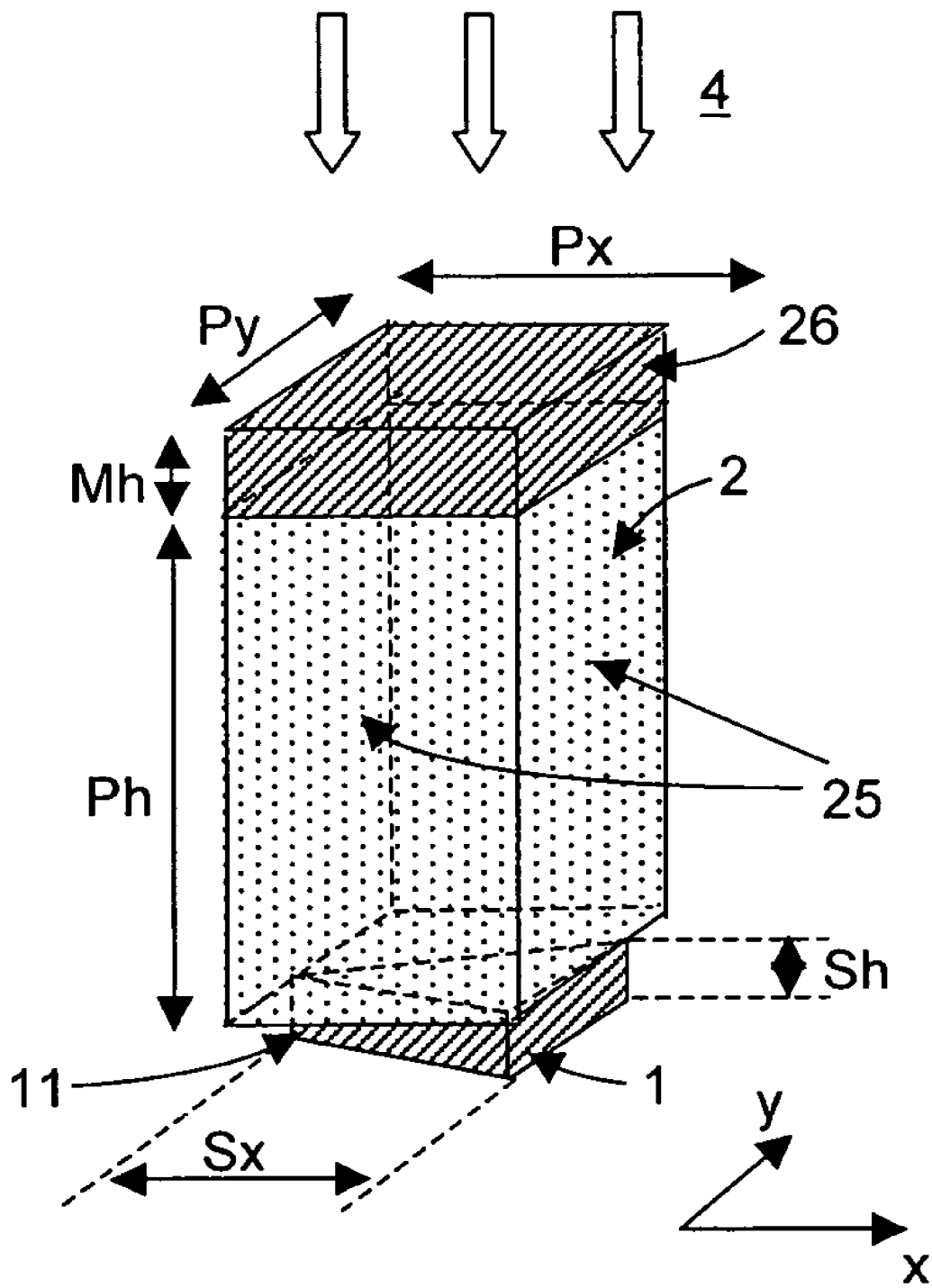
FIG. 26 is a view showing an example of a case where a reflective film is formed on an upper portion of a magnetic pole.

FIG. 26 shows an example of a case where the upper surface of the magnetic pole 2 having the shape of a cuboid is covered with a reflective film 26. In this example, the scatterer 1 having a triangular shape was placed under the magnetic pole 2 having the shape of a cuboid. The material of the scatterer 1 was gold. The width Sx thereof was set at 100 nm, and the thickness Sh thereof was set at 30 nm. The angle at the vertex 11 of the scatterer 1 at which an optical near-field was generated was set at 60 degrees. The magnetic pole 2 had the shape of a cuboid, and was placed in contact with the scatterer 1. The x-direction width Px of the magnetic pole was set at 100 nm, the y-direction width Py thereof was set at 100 nm, and the height Ph thereof was set at 400 nm. The material of the reflective film 26 on the upper surface of the magnetic pole was gold, and the thickness Mh thereof was set at 30 nm. Incident light was made incident from above the magnetic pole (in the direction represented by arrows 4), and the direction of polarization was the x direction. The wavelength of the incident light was set at 780 nm. The material of the reflective film 26 on the upper surface of the magnetic pole was gold in the above-described example, but may be other material as long as it has a high reflectance. Other metal such as aluminum, silver, copper, or silicon or a semiconductor may be employed. Moreover, though only the upper surface of the magnetic pole was covered in the above-described example, the side surfaces 25 of the magnetic pole may also be covered.

Example 6

Next, an example will be described for the case where a scatterer is combined with a single pole transducer used in a magnetic disk device.

Figure 27:
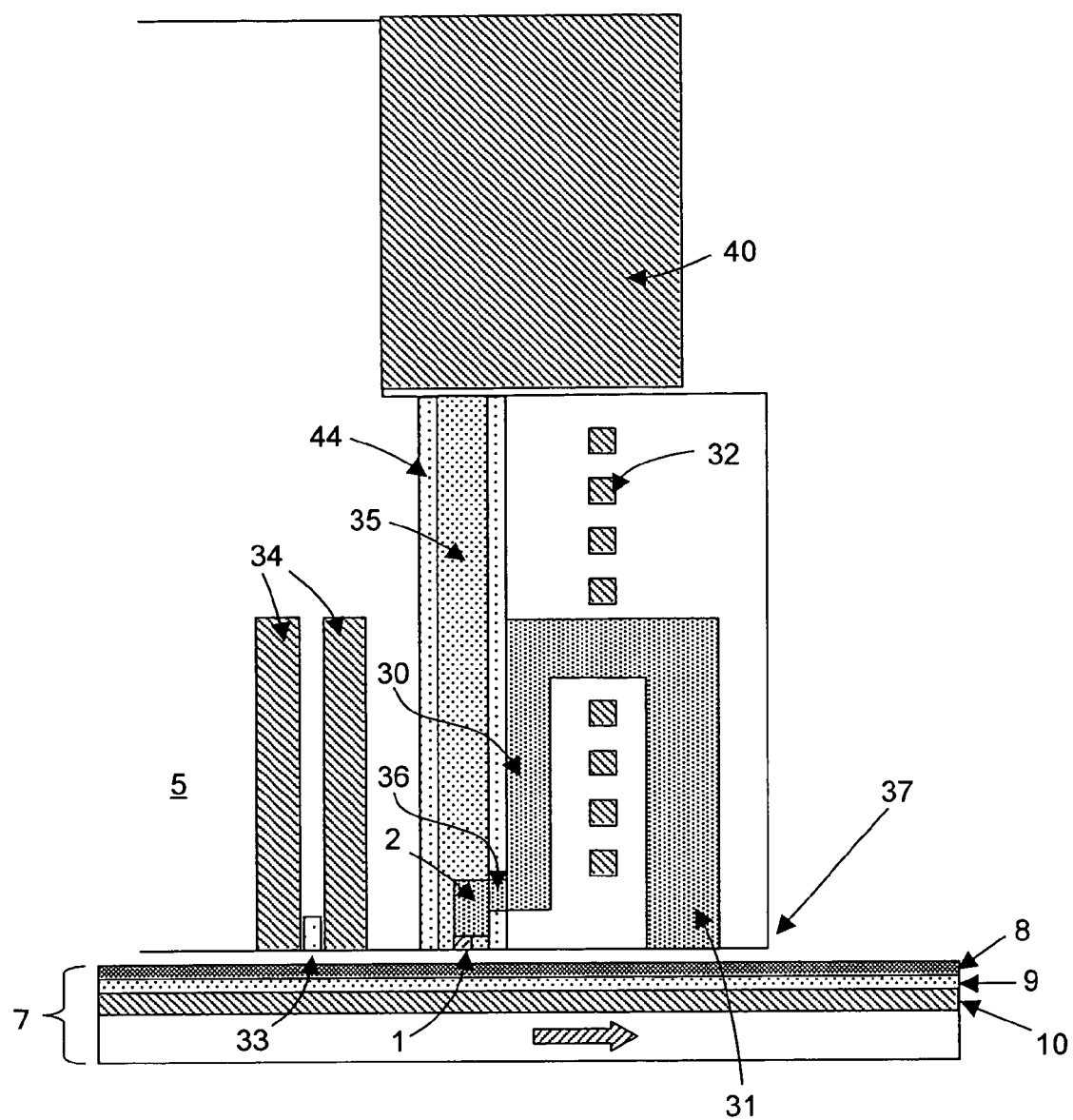
FIG. 27 is a view showing an example of a case where a single pole transducer and a scatterer are combined and where thin-film coils are placed on a trailing edge side.

FIG. 27 shows a cross-sectional view of a recording head made by combining a single pole transducer and a scatterer. The scatterer 1 for generating an optical near-field was formed in a surface of the slider 5, and the magnetic pole 2 was formed on the scatterer. Light was generated using a laser diode 40 having a wavelength of 785 nm, and the light generated in the laser diode 40 was led to the scatterer 1 using a waveguide including a core portion 35 and a cladding portion 44. The waveguide 35 is surrounded by the cladding portion 44. A magnetic field was generated using thin-film coils 32, and the generated magnetic field was led to the vicinity of the scatterer 1 by a main pole 30. The main pole 30 and the thin-film coil 32 were placed on a trailing edge 37 side of the waveguide. The magnetic pole 2 over the scatterer 1 and the main pole 30 were coupled using a magnetic pole 36. On the opposite side of the thin-film coils 32, a return pole 31 for forming a closed magnetic circuit was formed. The coils 32 are linked to a magnetic circuit formed by the magnetic pole 2 on the scatterer 1, the main pole 30, and the return pole 31. Beside the waveguide, a magnetic reproducing element 33 (giant magneto resistive (GMR) element or tunneling magneto resistive (TMR) element) for reproducing recording marks was formed. Around the magnetic reproducing element 33, a shield 34 for blocking a magnetic field from surroundings was formed. This reproducing element may be placed beside the return pole 31 (on the trailing edge 37 side). As the magnetic recording medium 7, used was one including a recording layer 8, a metal layer 9, and a soft under layer 10 for forming a closed magnetic circuit.

Figure 28:
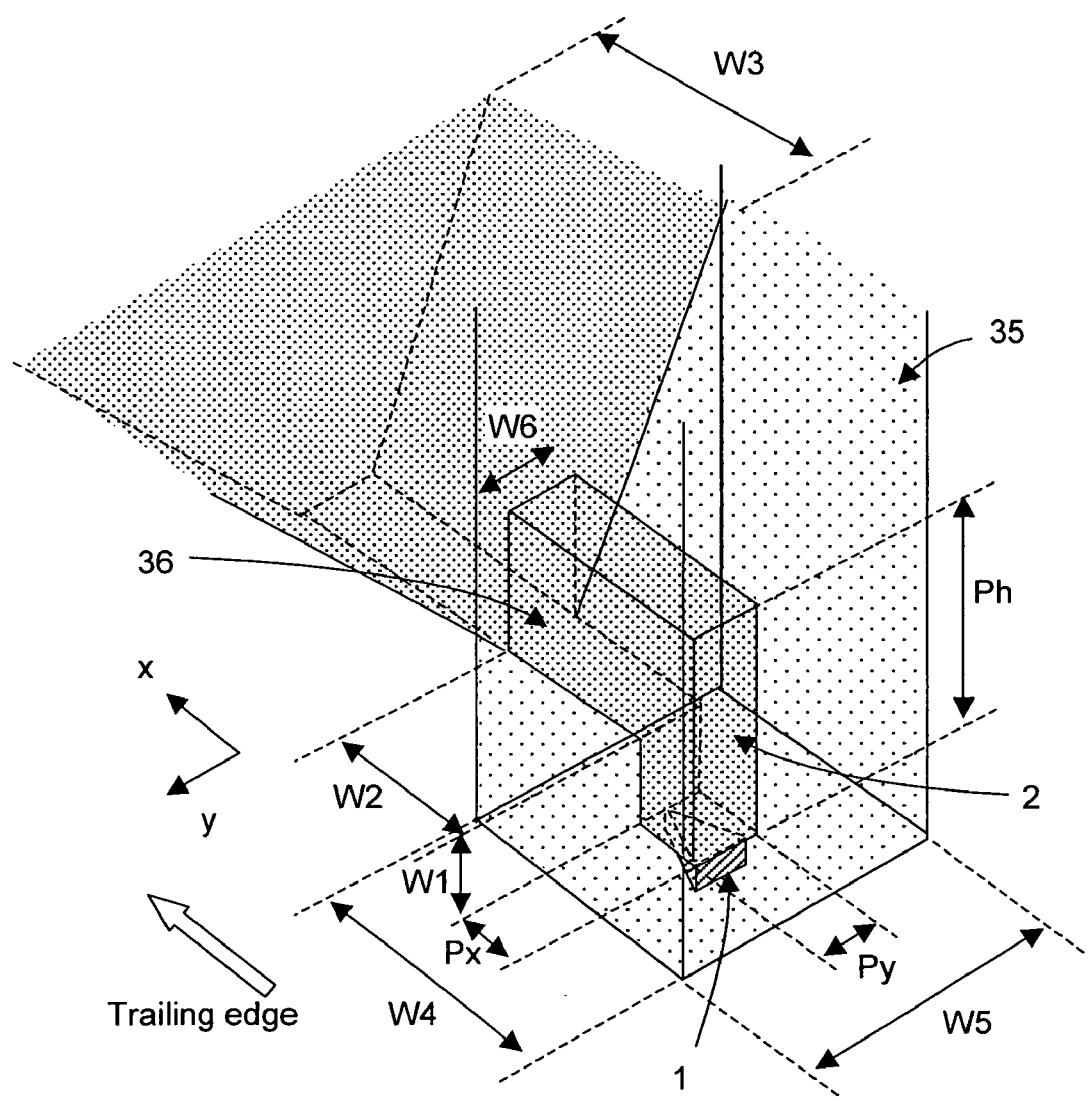
FIG. 28 is a view showing an example of a relationship among a scatterer, a magnetic pole placed thereon, and a main pole.

FIG. 28 shows an enlarged view of the vicinity of the scatterer 1. In this example, the scatterer 1 having a triangular shape was placed in a center portion of the waveguide 35. The orientation of the scatterer 1 was set in an orientation in which the vertex 11 where an optical near-field was generated pointed to the trailing edge 37. Over the scatterer, the magnetic pole 2 which was made of FeCo alloy and which had the shape of a cuboid was formed. The magnetic pole 2 and the main pole 30 were coupled by the magnetic pole 36. A tip portion of the main pole 30 gradually became narrower with decreasing distance from the tip thereof so that magnetic fluxes are efficiently collected at the magnetic pole 36. The material of the scatterer 1 was gold. The x-direction width Sx thereof was set at 100 nm, and the thickness Sh thereof was set at 50 nm. The angle at the vertex 11 at which an optical near-field was generated was set at 60 degrees. With regard to dimensions of the magnetic pole 2, Px was set at 100 nm, Py was set at 100 nm, and Ph was set at 400 nm. The width W3 of the main pole was set at 1.5 μm. With regard to dimensions of the magnetic pole 36 for coupling the magnetic pole 2 to the main pole, W6 was set at 100 nm, and W2 was set at 300 nm. The distance W1 between the bottom of the magnetic pole 2 over the scatterer and the magnetic pole 36 for coupling the magnetic pole 2 to the main pole was set at 100 nm. The material of the core portion 35 of the waveguide was $TiO_2$, and the material of the cladding portion 44 around the core portion 35 was $SiO_2$. The widths W4 and W5 of the core portion were set at 400 nm. The material of the core portion of the waveguide may be anything as long as it has a higher refractive index than that of the cladding portion, and may be $Ta_2O_5$, SiN, $SiO_2$ doped with Ge, a high-refractive-index polymer, or the like. Moreover, the shape of the waveguide may be a tapered shape (the diameter at the entrance of the waveguide is made larger than the diameter at the exit thereof) in order to facilitate the coupling of light to the waveguide. In this case, in order to reduce background light generated at the exit of the waveguide, the widths W4 and W5 of the waveguide core portion at the exit of the waveguide may be set at values of not more than 400 nm, e.g., 250 nm. Although the width W6 of the magnetic pole 36 was set equal to the width Py of the scatterer 1 in this example, W6 may be set larger than Py in order to facilitate the flow of magnetic fluxes from the main pole 30 to the magnetic pole 2 over the scatterer. Furthermore, the material of the scatterer was gold in the above-described example, but may be a soft magnetic material such as FeCo as in the example of FIG. 16.

Figure 29:
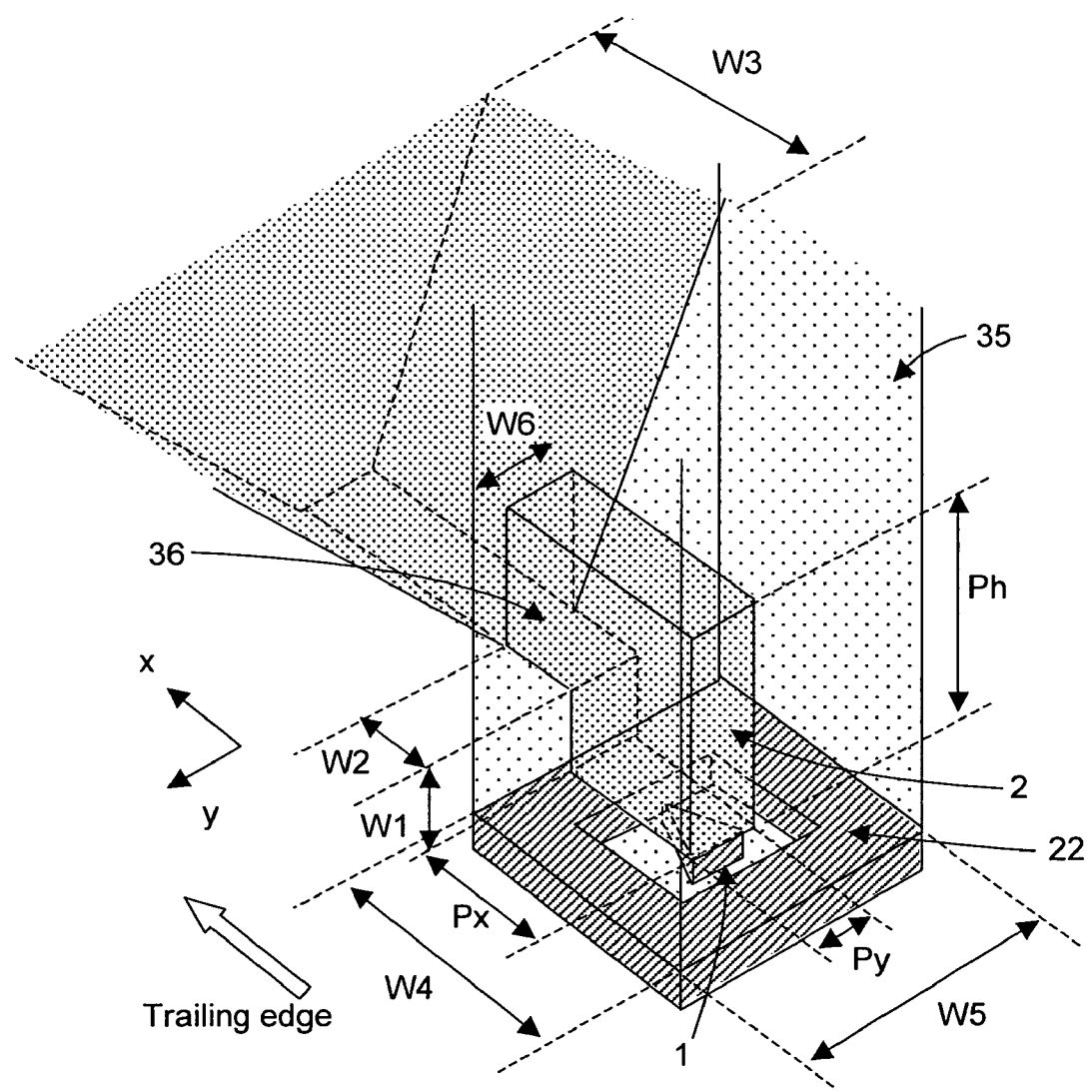
FIG. 29 is a view showing an example of a relationship which exists among the scatterer, the magnetic pole placed thereon, and the main pole in a case where a shield is formed around the scatterer.

FIG. 29 shows an example of a case where a shield is formed around the scatterer 1 as in FIG. 22, and where the scatterer 1 and the magnetic pole 2 are placed so that the vertex 11 at which an optical near-field is generated is positioned in a center portion of the magnetic pole. As in the example of FIG. 28, the magnetic pole 2 over the scatterer 1 and the main pole 30 are coupled by the magnetic pole 36. The materials, shapes, and dimensions of the scatterer 1 and the shield 22 were the same as in the example shown in FIG. 22. The material of the magnetic pole 2 was FeCo alloy. With regard to dimensions thereof, Px was set at 200 nm, Py was set at 100 nm, and Ph was set at 400 nm. The width W3 of the main pole was set at 1.5 μm. With regard to dimensions of the magnetic pole 36 for coupling the magnetic pole 2 to the main pole, W6 was set at 100 nm, and W2 was set at 300 nm. The distance W1 between the bottom of the magnetic pole 2 over the scatterer and the magnetic pole 36 for coupling to the main pole was set at 100 nm. The material of the core portion of the waveguide 35 was $TiO_2$, and the material of the cladding portion around the core portion was $SiO_2$. The widths W3 and W4 of the core portion were set at 400 nm.

Figure 30:
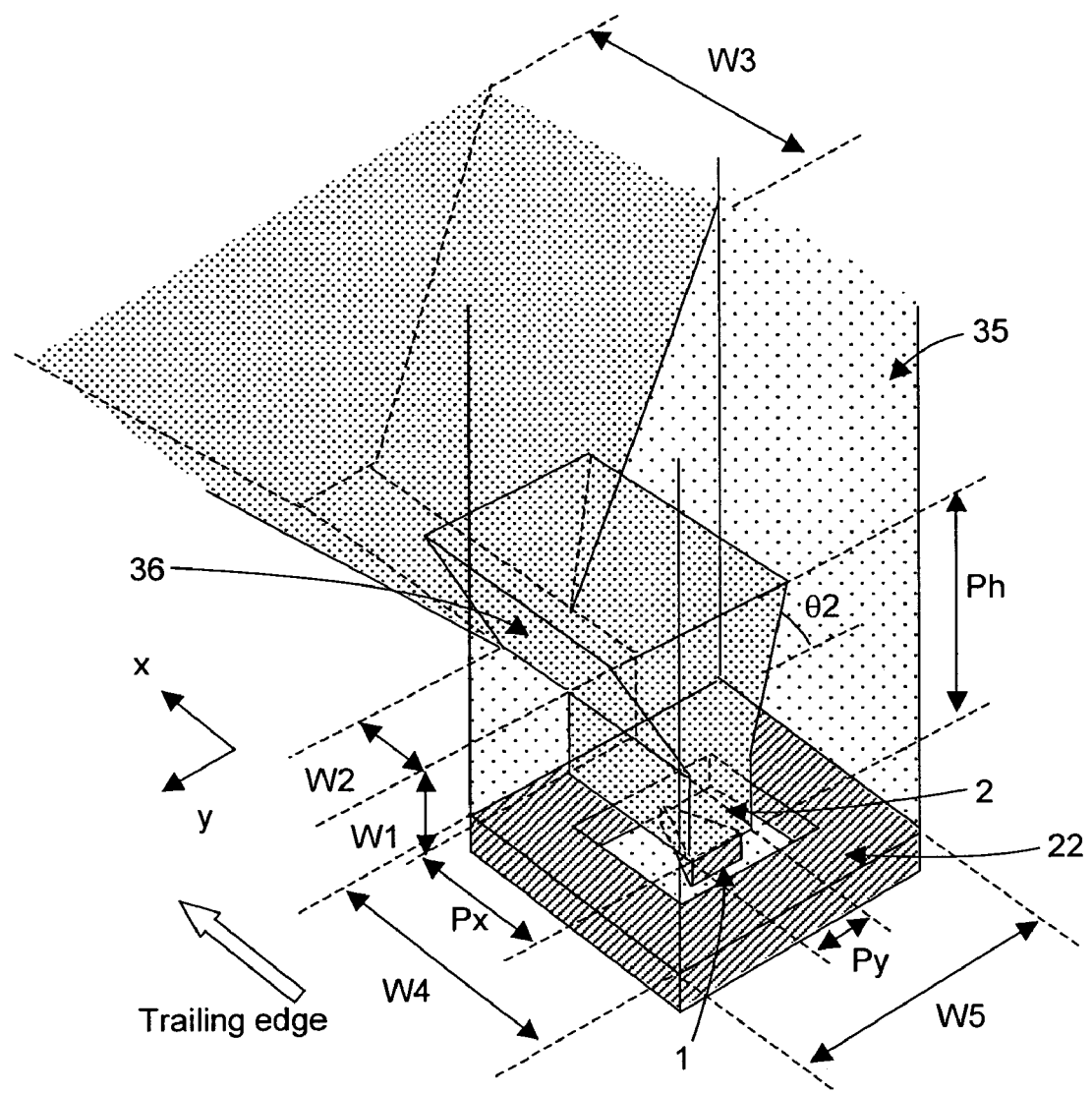
FIG. 30 is a view showing an example of a relationship which exists among the scatterer, the magnetic pole placed thereon, and the main pole in a case where a width of a magnetic pole coupling the magnetic pole over the scatterer and the main pole decreases with increasing distance from the top thereof.

In the above-described example, the widths of the magnetic pole 36 connecting the magnetic pole 2 over the scatterer and the main pole 30 may be gradually decreased with decreasing distance from the bottom thereof (with decreasing distance from the scatterer 1) as shown in FIG. 30. This facilitates the flow of magnetic fluxes from the main pole 30 to the magnetic pole 2 over the scatterer. Accordingly, the intensity of the magnetic field generated at the lower portion of the magnetic pole 2 can be increased. In the example of FIG. 30, with regard to dimensions of the magnetic poles 2 and 36, Px was set at 200 nm, Py was set at 100 nm, Ph was set at 400 nm, W1 was set at 100 nm, W2 was set at 300 nm, and the spread angle θ2 was set at 60 degrees.

Figure 31:
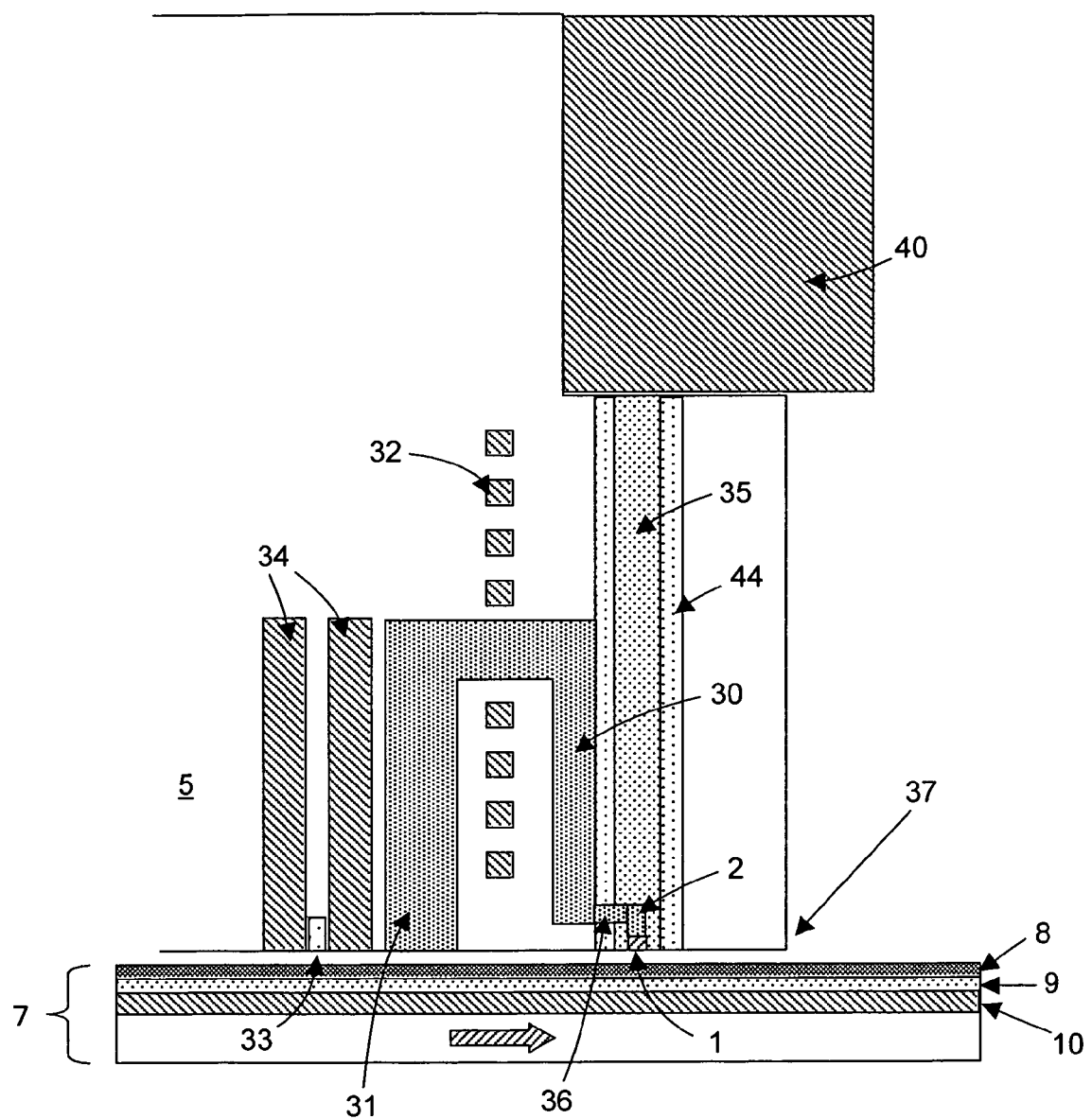
FIG. 31 is a view showing an example of a case where a single pole transducer for a magnetic recording device and a scatterer are combined and where a thin-film coil is placed on the opposite side to a trailing edge.
Figure 32:
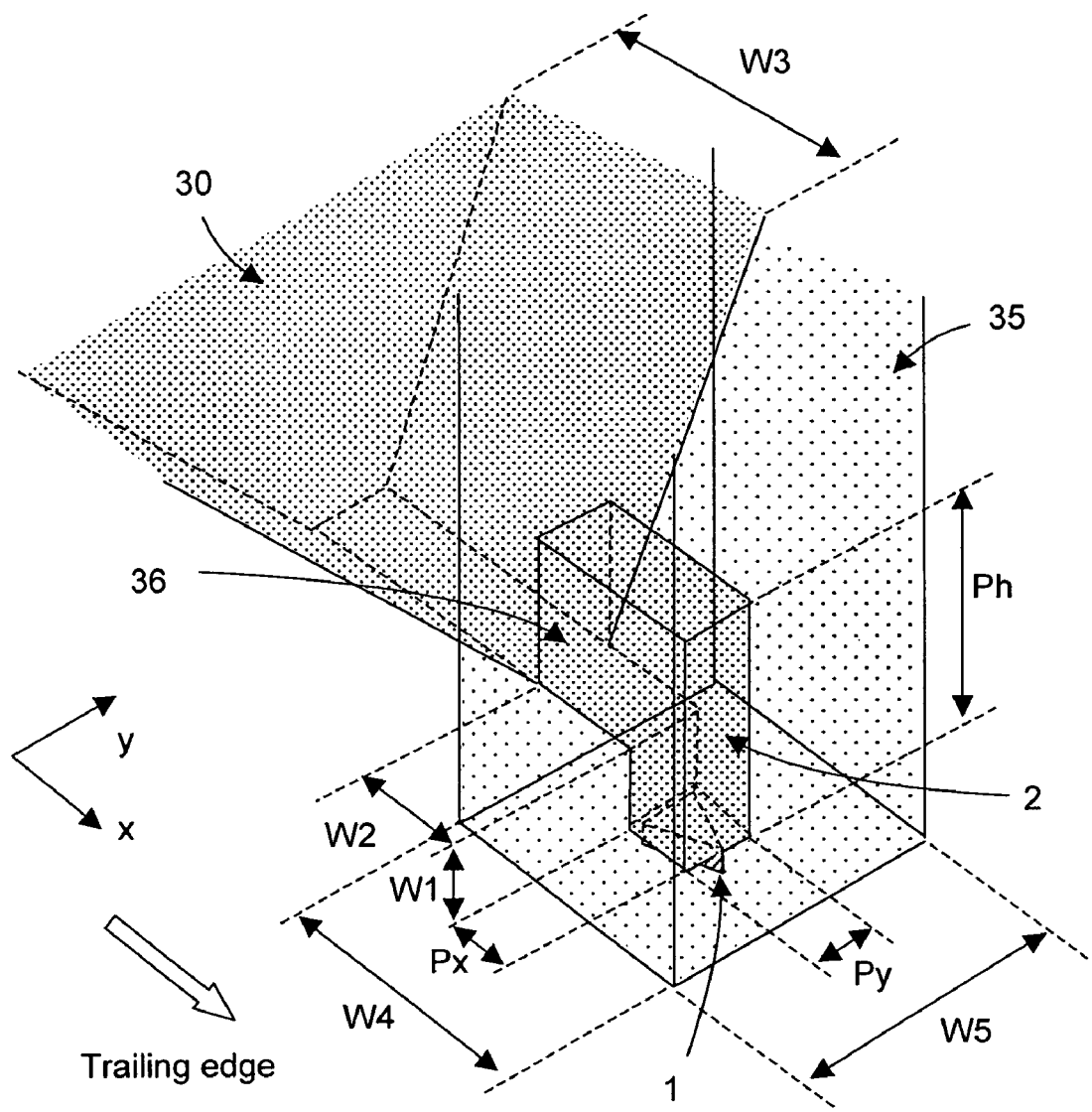
FIG. 32 is a view showing an example of a relationship which exists among the scatterer, the magnetic pole placed thereon, and the main pole for the case where the thin-film coils are placed on the opposite side to the trailing edge.

The main pole 30 and the thin-film coil 32 were placed on the trailing edge 37 side in the above-described example, but may be placed on the opposite side to the trailing edge as shown in FIG. 31. FIG. 32 shows an enlarged view of the vicinity of the scatterer 1 for that case. Dimensions of the scatterer 1 and the magnetic poles were the same as those in FIG. 28, and the orientation of the scatterer 1 was opposite to that of the case of FIG. 28.

Figure 33:
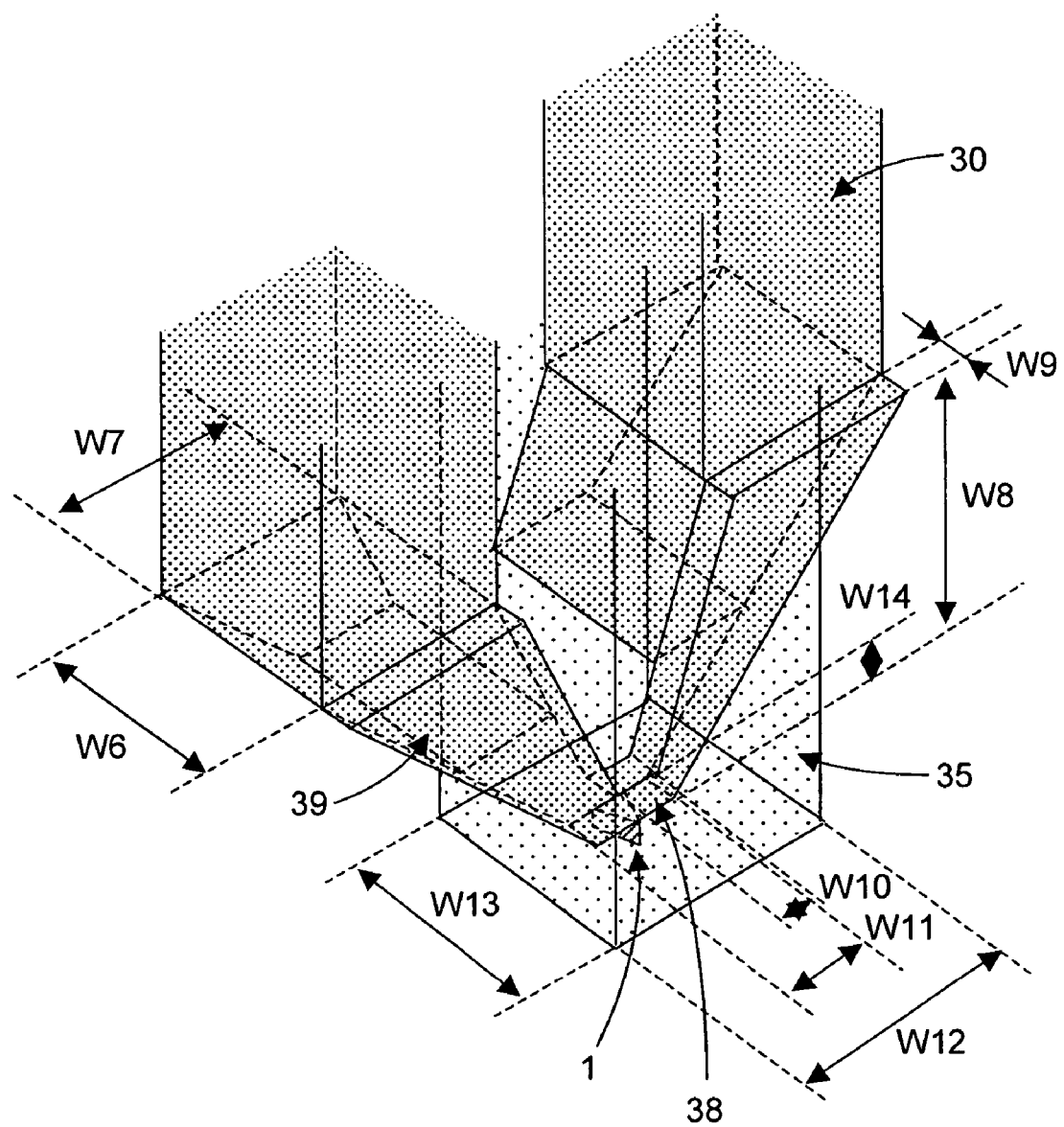
FIG. 33 is a view showing an example of a case where main poles are formed respectively at both sides of a waveguide.

FIG. 33 shows an example of a case where main poles 30 are provided on both sides of the waveguide 35. A magnetic pole 38 having the shape of a cuboid was placed over the scatterer 1, and the magnetic pole 38 and the two main poles 30 were coupled by a magnetic pole 39 which gradually becomes narrower with decreasing distance from the tip. The material, shape, and dimensions of the scatterer 1 were the same as those in the example shown in FIG. 3. The material of the magnetic pole 38 over the scatterer 1 and the magnetic pole 39 for coupling the magnetic pole 2 to the main poles 30 was FeCo alloy. W10 was set at 100 nm, W11 was set at 300 nm, W14 was set at 100 nm, W9 was set at 100 nm, and W8 was set at 2.2 μm. The widths W6 and W7 of the main poles were set at 2 μm. The material of the core portion 35 of the waveguide was $TiO_2$, and the widths W12 and W13 of the core portion were set at 400 nm.

Figure 34:
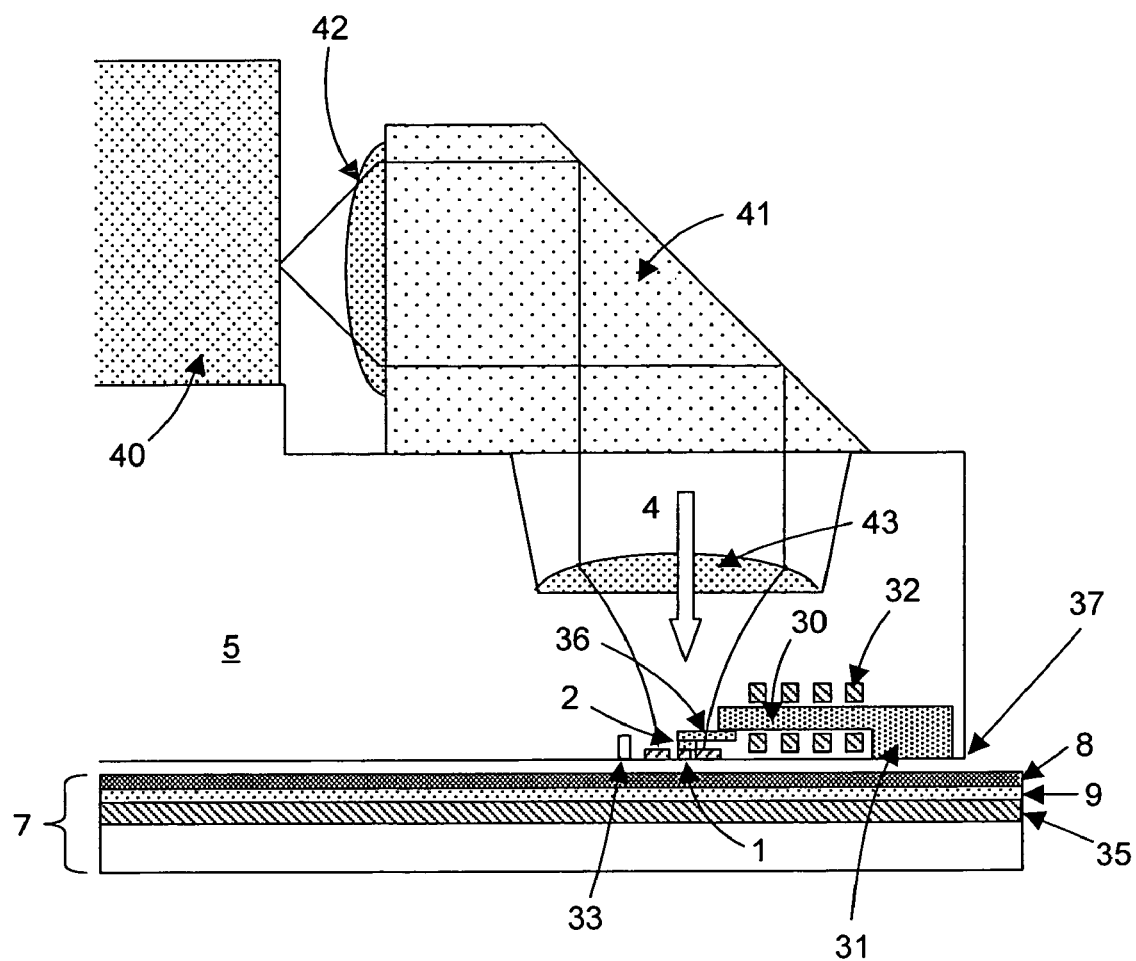
FIG. 34 is a view showing an example of a case where a main pole is placed parallel to the bottom surface of a slider.
Figure 35:
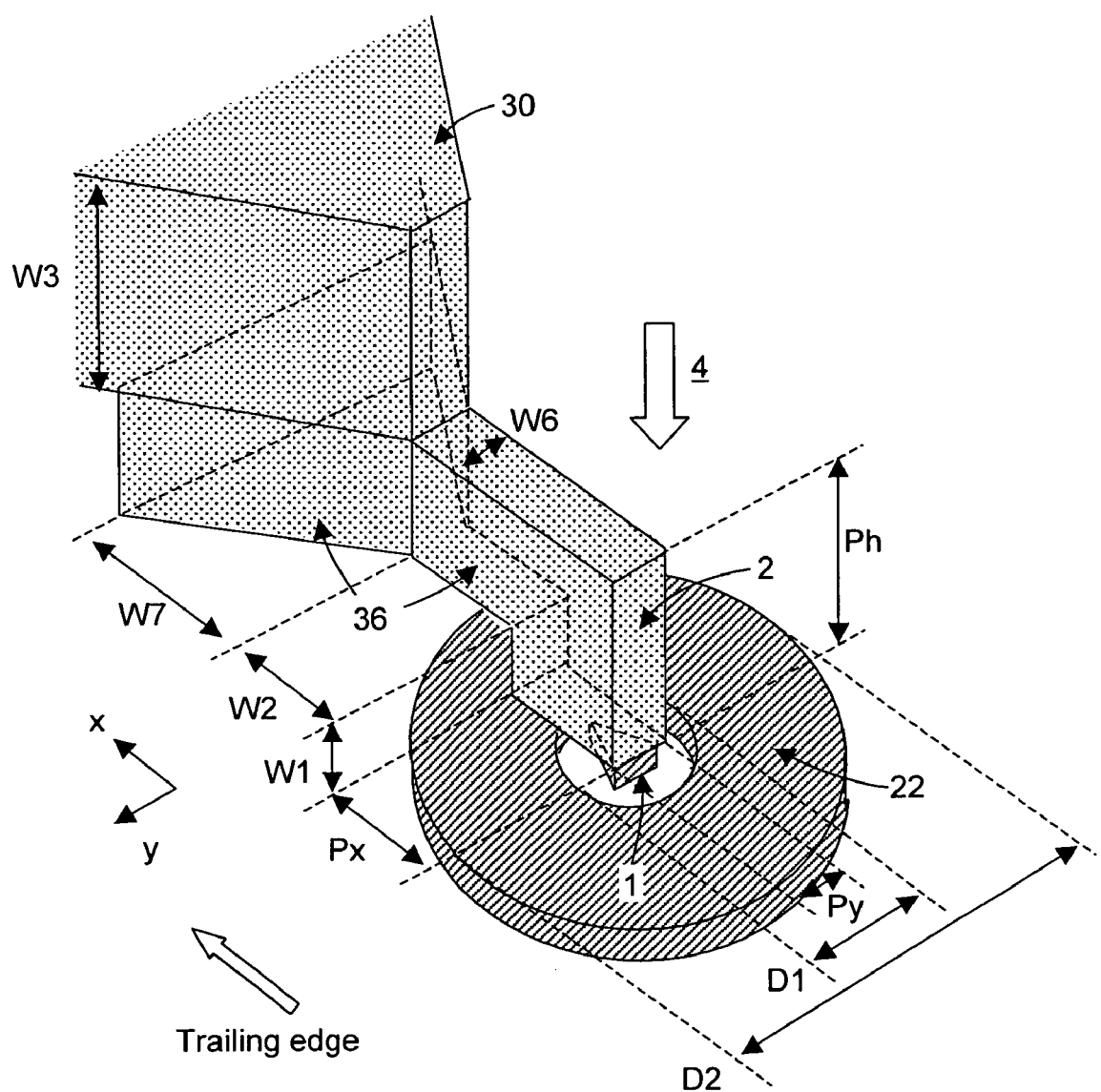
FIG. 35 is a view showing an example of a relationship which exists among the scatterer, the magnetic pole placed thereon, and the main pole in a case where the main pole is placed parallel to the bottom surface of the slider.

FIGS. 34 and 35 show an example of a case where incident light is collected by a microlens. The light is generated by the laser diode 40, formed into parallel light by a collimating lens 42, and then reflected by a prism mirror 41 so as to travel in a direction perpendicular to a bottom portion of the slider. A microlens 43 was formed in the upper surface of the slider to collect the incident light. The scatterer 1 was placed at the focal point, and the magnetic pole 2 was placed over the scatterer 1. The magnetic pole 2 and the main pole 30 were coupled by the magnetic pole 36. At this time, in order to prevent the incident light from being blocked by the main pole, the main pole was placed parallel to the bottom portion of the slider 5. A magnetic field was generated by the thin-film coils 32. The material of the scatterer 1 was gold. The x-direction width Sx thereof was set at 100 nm, and the thickness Sh thereof was set at 50 nm. The angle at the vertex 11 at which an optical near-field was generated was set at 60 degrees. Around the scatterer 1, a circular shield 22 was formed. The material of the shield 22 was gold. The outer diameter D2 of the shield was set at 1.5 μm, and the diameter D1 of the opening portion was set at 250 nm. With regard to dimensions of the magnetic pole 2, Px was set at 100 nm, Py was set at 100 nm, and Ph was set at 400 nm. With regard to dimensions of the magnetic pole 36 for coupling the main pole 30 and the magnetic pole over the scatterer, W2 was set at 400 nm, W6 was set at 100 nm, and W1 was set at 100 nm. The magnetic pole 36 for coupling the main pole 30 and the magnetic pole over the scatterer was placed to overlap with the main pole at a tip portion of the main pole, and the length W7 of the overlapping portion was set at 3 μm. The width W3 of the main pole was set at 1.5 μm, and the width of the tip of the main pole was gradually decreased with decreasing distance from the tip thereof.

Example 7

Next, the application of a head of the present invention to a recording device will be described.

Figure 36:
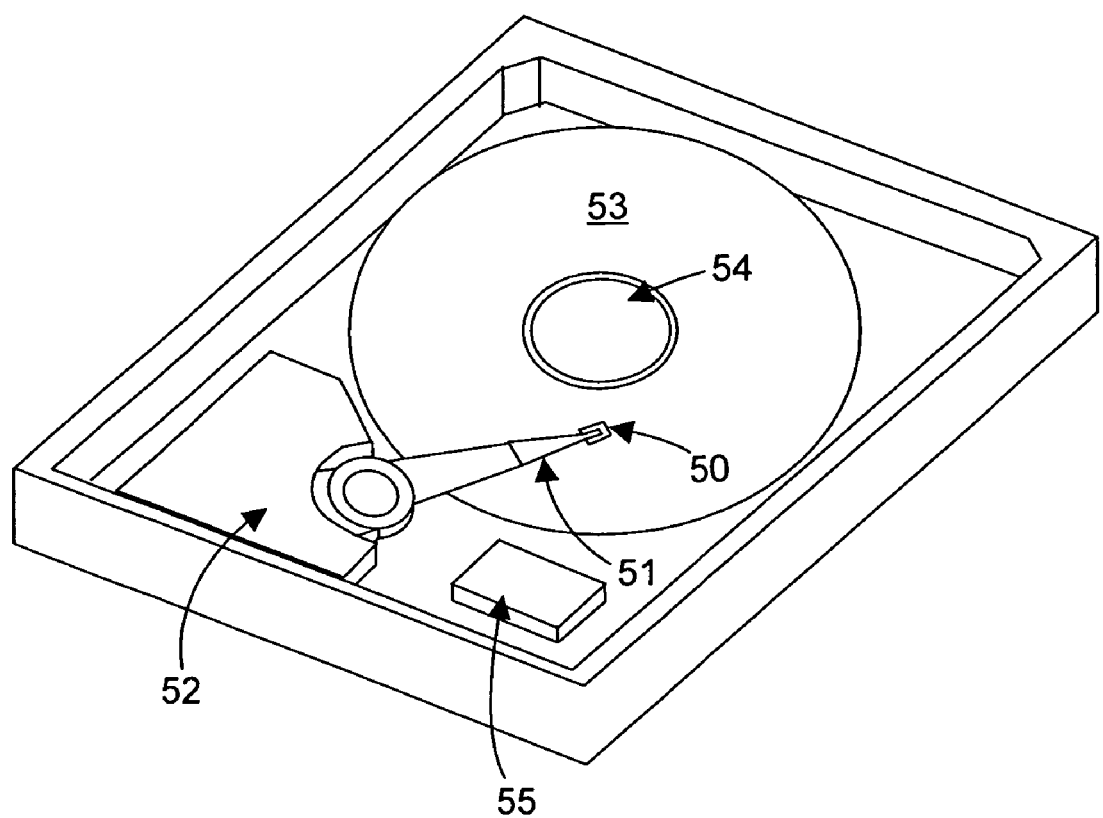
FIG. 36 is a view showing a constitution example of a recording and reproducing device.

FIG. 36 shows an example in which a recording head of the present invention is applied to a thermal assisted magnetic recording device. A recording head 50 of the present invention was fixed to a suspension 51, and the position of the recording head 50 was moved by a voice coil motor 52. Pads were formed on a surface of the head, and were made to fly over a recording disk 53 at a flying height of not more than 10 nm. As the recording disk 53, a magnetic recording medium was used. The recording disk 53 rotates by being fixed to a spindle 54 driven to rotate by a motor. At the instant of recording, a magnetic field was generated by coils provided in the recording head 50, and, at the same time, a laser diode formed in the recording head 50 was made to emit light, thus forming a recording mark. For reproduction, a magnetic reproducing element 33 formed in a surface of a slider was used. A reproduced signal was processed by a signal processing LSI 55.

What is claimed is:

1. A head for a thermal assisted magnetic recording device, comprising:
 a coil for generating a magnetic field;
 a magnetic pole; and
 a scatterer for generating an optical near-field, the scatterer having conductivity and having an upper major surface,
 wherein the magnetic pole is placed over the upper major surface of the scatterer so that a direction that is perpendicular to the upper major surface of the scatterer and a direction of an axis of the magnetic pole are substantially in parallel.

2. The head according to claim 1, wherein the coil, the magnetic pole, and the scatterer are mounted in a slider, and widths of the magnetic pole which extend in directions transverse to the axis are not less than a distance between an air bearing surface of the slider and a bottom surface of the magnetic pole and not more than 500 nm.

3. The head according to claim 1, wherein when a direction to the scatterer is a positive direction and when an opposite direction to the direction to the scatterer is a negative direction, a position of an edge portion of the magnetic pole relative to a position of a vertex of the scatterer at which the optical near-field is generated is not less than −100 nm and not more than a distance between an air bearing surface of the slider and a bottom surface of the magnetic pole.

4. The head according to claim 1, wherein a thickness of the scatterer is not less than $c/(2\omega k)$ and not more than widths of the magnetic pole which extend in directions transverse to the axis, where k is an imaginary part of a refractive index of a material constituting the scatterer, w is an angular frequency of incident light, and c is the speed of light.

5. The head according to claim 1, wherein a bottom portion of the magnetic pole is partially cut away in a region around the scatterer.

6. The head according to claim 1, wherein a material constituting the scatterer is a soft magnetic material.

7. The head according to claim 1, wherein a second scatterer is placed near a vertex of the scatterer at which the optical near-field is generated.

8. The head according to claim 1, wherein another scatterer is placed near a vertex of the scatterer at which the optical near-field is generated, and an edge portion of the scatterer substantially coincides with an edge portion of the magnetic pole, the edge portion of the scatterer being positioned opposite to the vertex of the scatterer at which the optical near-field is generated.

9. The head according to claim 8, wherein the another scatterer is a shield formed around the scatterer having the vertex at which the optical near-field is generated.

10. The head according to claim 1, wherein a reflective film is formed on an upper surface and/or side surfaces of the magnetic pole.

11. The head according to claim 1, further comprising:
 a main pole; and
 a return pole,
 wherein the magnetic pole is coupled to the main pole, and the coil is linked to a magnetic circuit formed by the magnetic pole, the main pole, and the return pole.

12. A thermal assisted magnetic recording device comprising:
 a magnetic recording medium;
 a medium driving section for driving the magnetic recording medium;
 a head for performing recording and reproducing operations on the magnetic recording medium; and
 a head driving section for determining a position of the head relative to the magnetic recording medium;
 wherein the head comprises: a coil for generating a magnetic field; and a scatterer for generating an optical near-field, the scatterer having conductivity;
 wherein the magnetic pole is placed over the scatterer; and
 wherein the scatterer has an upper major surface, and the magnetic pole is placed over the upper major surface of the scatterer so that a direction that is perpendicular to the upper major surface of the scatterer and a direction of an axis of the magnetic pole are substantially in parallel.

13. The head according to claim 1, wherein the upper major surface of the scatterer extends in a plane substantially parallel to a bottom surface of the magnetic pole.

14. The thermal assisted magnetic recording device according to claim 12, wherein the upper major surface of the scatterer extends in a plane substantially parallel to a bottom surface of the magnetic pole.

15. The thermal assisted magnetic recording device according to claim 12, wherein the upper major surface of the scatterer extends substantially in parallel to a surface of the magnetic recording medium.

16. The thermal assisted magnetic recording device according to claim 1, wherein the magnetic pole is placed over the upper major surface of the scatterer and disposed so that a magnetic field from the magnetic pole and the optical near-field generated by the scatterer overlap.

17. The thermal assisted magnetic recording device according to claim 12, wherein the magnetic pole is placed over the upper major surface of the scatterer and disposed so that a magnetic field from the magnetic pole and the optical near-field generated by the scatterer overlap.

* * * * *